(12) United States Patent
Bernstein et al.

(10) Patent No.: US 7,677,441 B2
(45) Date of Patent: Mar. 16, 2010

(54) RELAXED CURRENCY CONSTRAINTS

(75) Inventors: Philip A. Bernstein, Bellevue, WA (US); Raghu Ramakrishnan, Madison, WI (US); Alan D. Fekete, Cammeray (AU)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 11/096,291

(22) Filed: Apr. 1, 2005

(65) Prior Publication Data
US 2006/0219772 A1 Oct. 5, 2006

(51) Int. Cl.
*G07F 19/00* (2006.01)
(52) U.S. Cl. ................ 235/379; 707/999.003; 707/999.008; 707/999.101; 707/999.102; 707/999.201
(58) Field of Classification Search ............ None
See application file for complete search history.

(56) References Cited

U.S. PATENT DOCUMENTS

| | | | |
|---|---|---|---|
| 5,353,229 A * | 10/1994 | Tanaka .................. 700/103 |
| 5,355,474 A * | 10/1994 | Thuraisngham et al. ...... 707/9 |
| 5,870,758 A | 2/1999 | Bamford et al. |
| 6,158,044 A | 12/2000 | Tibbetts |
| 6,289,335 B1 * | 9/2001 | Downing et al. ........... 707/3 |
| 6,393,473 B1 * | 5/2002 | Chu ..................... 709/223 |
| 6,456,995 B1 * | 9/2002 | Salo et al. ............... 707/1 |
| 6,584,476 B1 * | 6/2003 | Chatterjee et al. ......... 707/203 |
| 2001/0049685 A1 * | 12/2001 | Carey et al. ............ 707/103 R |
| 2002/0156661 A1 * | 10/2002 | Jones et al. ............... 705/6 |
| 2004/0093467 A1 * | 5/2004 | Shen et al. ............... 711/141 |
| 2005/0027542 A1 * | 2/2005 | Bordawekar et al. ......... 705/1 |
| 2005/0132316 A1 * | 6/2005 | Suaris et al. ............ 716/11 |
| 2005/0210010 A1 * | 9/2005 | Larson et al. ............. 707/3 |
| 2006/0047721 A1 | 3/2006 | Narang et al. |
| 2006/0101000 A1 * | 5/2006 | Hacigumus et al. ......... 707/3 |
| 2006/0155743 A1 | 7/2006 | Bohannon et al. |

OTHER PUBLICATIONS

Robert H. Thomas. A Majority Consensus Approach to Concurrency Control for Multiple Copy Databases. ACM Transactions on Database Systems, vol. 4, No. 2, Jun. 1979, pp. 180-209.

Uwe Rohm, et al. FAS—a Freshness-Sensitive Coordination Middleware for a Cluster of OLAP Components. Proceedings of the 28th VLDB Conference, Hong Kong, China, 2002.

***Francois Bancilhon, et al. A Model of CAD Transactions. Proceedings of the VLDB 85, Stockholm. pp. 25-33.

(Continued)

*Primary Examiner*—Don Wong
*Assistant Examiner*—Shyue Jiunn Hwa
(74) *Attorney, Agent, or Firm*—Lee & Hayes, PLLC

(57) ABSTRACT

The subject invention pertains to transaction processing systems and methodologies that allows update transactions to read stale data copies and update a data store therewith. Each transactional operation, including a read, can carry or be associated with one or more freshness constraints or tests that specify how fresh a data copy must be in order to be read. More specifically, the subject invention provides systems and methods that extend transactions and serializability to account for out-of-date reads that are justified by freshness requirements.

17 Claims, 19 Drawing Sheets

OTHER PUBLICATIONS

Chris Olston, et al. Adaptive Precision Setting for Cached Approximate Values. ACM SIGMOD. May 21-24, 2001. Santa Barbara, CA, USA.

Divyakant Agrawal, et al. Consistency and Orderability: Semantics-Based Correctness Criteria for Databases. ACM Transactions on Database Systems, vol. 18, No. 3, Sep. 1993. pp. 460-486.

Rafael Alonso, et al. Quasi-Copies: Efficient Data Sharing for Information Retrieval Systems. 1988. pp. 443-468.

Daniel Barbara, et al. The Demarcation Protocol: A Technique for Maintaining Linear Arithmetic Constraints in Distributed Database Systems. 1992. pp. 373-388.

Paul M. Bober, et al. On Mixing Queries and Transactions via Multiversion Locking. IEEE, 1992.

Krithi Ramamritham, et al. A Formal Characterization of Epsilon Serializability. 1995.

Chris Olston, et al. Offering a Precision-Performance Tradeoff for Aggregation Queries over Replicated Data. Proceedings of the 26th VLDB Conference, Cairo, Egypt, 2000.

Theo Harder. Handling Hot Spot Data in DB-Sharing Systems. Information Systems, vol. 13, No. 2, pp. 155-166. 1988. Great Britain.

Henry F. Korth, et al. Formal Aspects of Concurrency Control in Long-Duration Transaction Systems Using the NT/PV Model. ACM Transactions on Database Systems, vol. 19, No. 3, Sep. 1994. pp. 492-535.

Patrick E. O'Neil. The Escrow Transactional Method. ACM Transactions on Database Systems, vol. 11, No. 4, Dec. 1986. pp. 405-430.

Yixiu Huang, et al. Divergence Caching in Client-Server Architectures. Proceedings of the Third International Conference on Parallel and Distributed Information Systems (PDIS '94), Austin, TX. Sep. 1994, IEEE, pp. 131-139.

Haifeng Yu, et al. Efficient Numerical Error Bounding for Replicated Network Services. Proceedings of the 26th VLDB Conference, Cairo, Egypt, 2000.

Gio Wiederhold, et al. Modeling Asynchrony in Distributed Databases. IEEE, 1987.

Calton Pu, et al. Replica Control in Distributed Systems: An Asynchronous Approach. SIGMOD, 1991.

Hongfei Guo, et al. Relaxed Currency and Consistency: How to Say "Good Enough" in SQL. SIGMOD 2004. Jun. 13-18, 2004, Paris, France.

Rajeev Rastogi, et al. On Correctness of Non-serializable Executions. ACM, 1993. Washington D.C.

Dieter Gawlick, et al. Tandem—Varieties of Concurrency Control in IMS/VS Fast Path. Technical Report 85.6, Jun. 1985. Part No. 87613.

Hector Garcia-Molina, et al. Read-Only Transactions in a Distributed Database. ACM Transactions on Database Systems, vol. 7, No. 2, Jun. 1982, pp. 209-234.

Philip A. Bernstein, et al. Concurrency Control and Recovery in Database Systems. Addison-Wesley Publishing Co. 1987.

International Search Report dated Nov. 16, 2007 for PCT Application Serial No. PCT/US06/08422, 3 Pages.

* cited by examiner

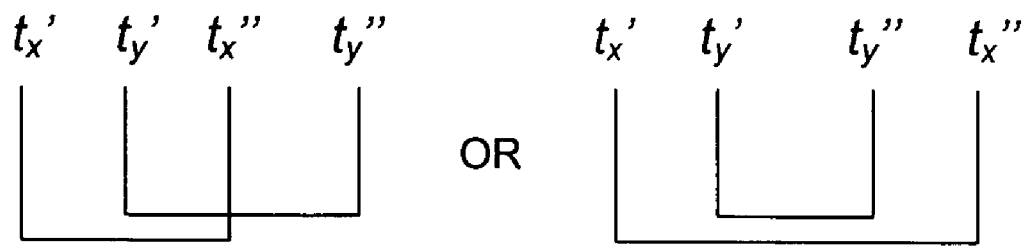
(i) OVERLAPPING INTERVALS
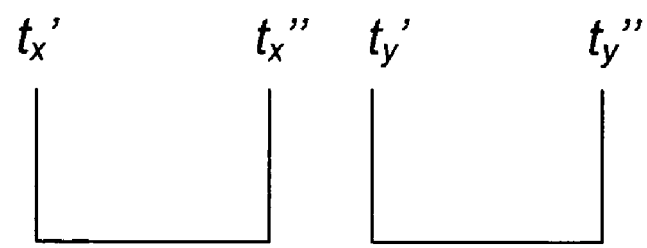
(ii) DISJOINT INTERVALS
Fig. 6

RELAXED CURRENCY CONSTRAINTS

TECHNICAL FIELD

The subject invention relates generally to computers and more particularly toward transaction processing systems and methods.

BACKGROUND

Resource management systems such as database systems or database management systems are very pervasive in present day enterprises. Database systems manage data that defines the state of a database. Typically, these systems provide centralized access to information by scores of users separately as well as simultaneously. Further complicating matters is the fact that such users may be geographically dispersed, for instance across a country or continent. By way of example, in the travel industry, airline reservation systems and hotel management systems receive a multitude of requests pertaining to ticket purchases or room reservations. These systems must store large amounts of information regarding seat or room assignments, current reservations, rates and the like, as well as make this information available on demand to millions of people around the world. In another example, financial institutions such as banks use database systems to maintain account and balance information for all its customers. Additionally, the systems must respond expeditiously to requests for such information from tellers, automated teller machines (ATMs), other banks, and from customer computers.

Database systems do not solely provide query or read-only functionality. They must also support a number of fundamental transactions that can alter the state or content of a database. In particular, data can be inserted, selected, updated, modified, or deleted. This can be challenging when a plurality of users are attempting to interact with the system simultaneously. For example, a number of people may try to reserve seats on an airline at the same time. A conflict between users can cause the database to include erroneous information such as incorrect seat assignments and over-booking a flight, among other things. Proper execution of transactions preserves database integrity or correctness. Conventionally, this is referred to as concurrency control or the correctness criterion for transactions.

Concurrency control systems and methods ensure a property called serializability is maintained. More specifically concurrency control ensures that execution of a set of transactions is equivalent to the serial execution of those transactions. Thus, some transactions can execute in parallel or concurrently thereby vastly improving performance as long as the end effect is as if the transactions had executed serially one after the other.

Transaction locks can be utilized to provide concurrency control. More specifically, transactions are units of work comprising one or more partially-ordered operations (e.g., read, write . . . ). All transaction operations must successfully complete before a transaction can issue a commit request that causes data in a database to become permanently altered. Alternatively, the transaction must be aborted and any changes made rolled back or removed. Locks are used by transactions to control access to data. A transaction can lock data or a segment of memory while it is interacting with the data. The lock prevents another transaction from locking that data, thereby also preventing the other transaction from reading or altering the value of the data while the transaction that holds the lock is using the same data. When a transaction desires to interact with data, it can request a lock, from a server for instance. That request can be granted, delayed, or denied. If it is granted, then the transaction acquires the lock and can begin operating on the data. If it is delayed, the transaction simply waits for a response. If it is denied, the transaction will typically abort.

Timestamps can also be employed to provide control over the currency of data that is read. While locking deals with concurrency control at execution time, timestamps can be employed to order transactions in advance. Timestamps are unique fixed numbers representing time. Prior to execution, each transaction can be assigned or associated with a unique timestamp. The timestamps can then determine the serial order of execution. Accordingly, if a transaction $T_i$ is assigned a timestamp $TS_i$ that is less than timestamp $TS_j$ associated with transaction $T_j$, then the system must ensure that execution schedule is equivalent to a serial schedule where $T_i$ is executed prior to $T_j$. To implement this, timestamps can be associated with data items, such as a write time stamp denoting the largest timestamp of a transaction that wrote successfully to the data item and a read timestamp denoting the largest value of a transaction that executed a read on that data item successfully. A timestamp ordering protocol can then be employed to ensure serializability.

Another fundamental property of transactions is durability. Once a transaction commits, meaning it completes successfully, then changes to the storage state should be preserved such that they can survive failure (e.g., power failure, system crash . . . ). Database systems provide for durable data storage, for example on disk. However, it is expensive in terms of the time required to interact with database data stored on disk. Accordingly, a cache (e.g., server, cache) is used to store data copies that are accessed more frequently. Utilization of a cache reduces the number of times the database storage medium needs to be accessed and therefore can dramatically improve the speed that data is made available. For example, a news organization's web server may cache the home page and all popular articles to ensure expeditious retrieval. However, a system must ensure that the cache is consistent with the database as it can be altered by user transactions. Thus, the database system must monitor the cache and upon change trigger an update transaction to effect changes on the database. Additionally, the database system can then refresh other cached copies maintained.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns relaxed currency systems and methods for update transactions. The subject invention is particularly useful in multi-tier database application systems in which some data is cached for performance or scalability reasons, for instance. Examples include but are not limited to e-commerce, auctions, or packaging transactions for a large number of users on the Internet. In such systems, read-only transactions or queries are allowed to read data in the cache. However, the information may be somewhat out-of-date, but this is satisfactory for queries. By contrast, update transactions are conventionally not allowed to read from the cache, because it can lead to incorrect executions based on the strict notion of correctness in transaction processing known as serializability. Nevertheless, in many cases this strict notion of correctness is stronger than what is required. That is, update transactions can tolerate somewhat stale data, provided it satisfies certain currency or freshness constraints, such as being no more than ten seconds out of date. The subject invention provides some specific freshness constraints as well as mechanisms and methodologies for supporting those and other currency constraints.

According to one aspect of the subject invention, a database update system is provided. The database update system includes a receiver component, a process component and a constraint verification system. The receiver component receives update transactions from users, applications or other entities and provides them to the process component. The process component processes the update transaction by reading stale data from cache and writing it to a durable data store, for example. The constraint verification component operates in conjunction with the process component to ensure that all freshness constraints associated with the transaction are satisfied. Accordingly, the constraint verification component can maintain information about transactions that can be utilized to test freshness constraints.

According to another aspect of the subject invention, a method is provided for checking relaxed currency constraints on transactions that perform updates. More specifically, data can be read from the cache that conforms to currency constraints. The read data can subsequently be utilized to update database data. At commit time, the currency constraints can be checked again prior to saving the data to durable storage.

Time and value bound constraints can be specified and enforced in accordance with an aspect of the subject invention. Time bound constraints can limit the time between when a data item version becomes invalid and the time it is read. For example, it is acceptable to read a version that is up to ten seconds out of date. Similarly, value bound constraints can specify the value tolerance. For instance, a value bound constraint can require that a value read be within a certain value (e.g., 10%) of a valid version.

In accordance with another aspect of the subject invention, drift constraints can be specified and enforced on multiple data items. More specifically, the subject invention provides for time drift and aggregate value drift constraints. Drift constraints specify mutual consistency amongst data items. A time drift constraint can require for every two data items that the versions thereof be read within a specified period of each other. Aggregate value drift constraints can require that an average computed over a set of data be read within a specified tolerance of a recent value at a specified time prior to the current time.

According to yet another aspect of the subject invention, a valid-till timestamp is introduced to facilitate specification and enforcement of certain kinds of freshness constraints. A valid-till timestamp provides an upper bound on the valid interval of stored data and copies thereof. Stated differently, it is the smallest timestamp that could be associated with the next version of a data item.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 6 is a graphical illustration of overlapping and disjoint intervals.

DETAILED DESCRIPTION

Figure 1:
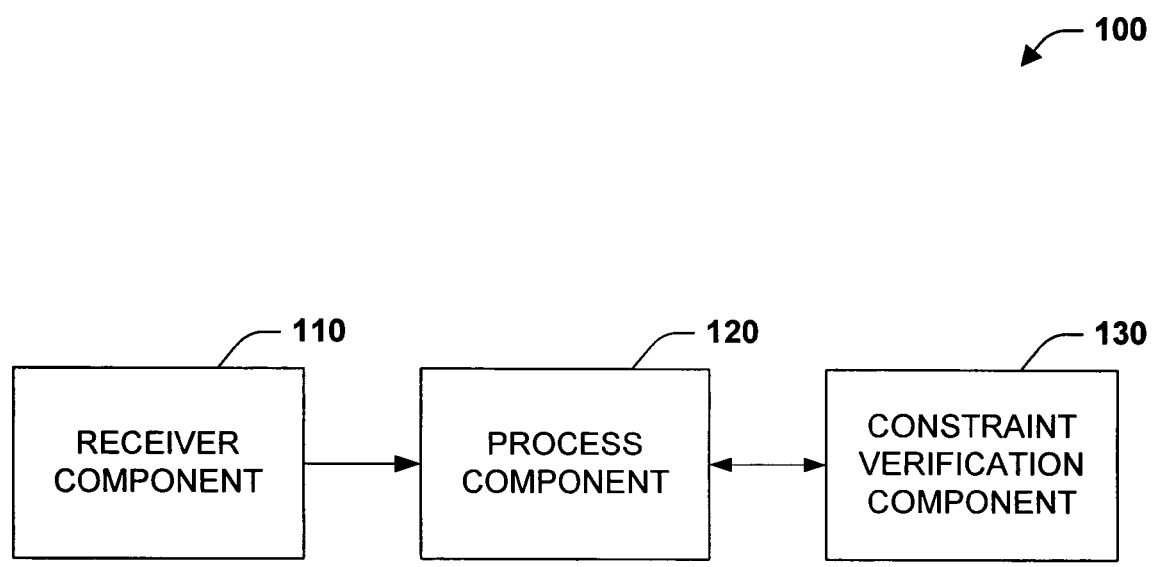
FIG. 1 is a block diagram of a transaction processing system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Turning initially to FIG. 1, a transaction processing system 100 is illustrated in accordance with an aspect of the subject invention. System 100 includes a receiver component 110, a process component 120 and a constraint verification component 130. Receiver component 110 receives one or more transactions. A transaction is a unit of work including a set of related operations or instructions that are executed together as a unit. To ensure data integrity, either all the operations in the transaction execute or none of the operations execute. By way of example, a transaction can correspond to operations on one or more bank accounts. The transaction can include debiting one account and crediting another account. Both the action of debiting an account and crediting another account should be completed or neither of them should be executed, at least because one would not want to debit an account without also crediting another. Otherwise, funds could be lost. The receiver component 110 can receive/retrieve transactions from one or more client applications including but not limited to spread sheets, electronic mail, forms managers, web browsers, and database interface software that seeks to retrieve information from a database, to update information in a database, to add new information to a database, to delete information from a database, or otherwise to interact therewith. These applications may be under the control of a human operator, may run automatically or under the control of another application or entity. According to an aspect of the subject invention, the transaction received by the receiver component 110 can be an update transaction. Generally, an update transaction can update a data source with new values. For instance, an update transaction can directly update a data source or it can first update a cache of database values after which the cached update is applied to the data source. Process component 120 is communicatively coupled to the receiver component 110 and can receive and/or retrieve transactions from the receiver component 110. Upon receipt of a transaction, the process component can process the transaction. In an update transaction, this can correspond to reading data from cache and then writing data to a database. Constraint verification component 130 can verify and/or enforce constraints upon transaction operations. Process component 120 can interact with constraint verification component 130 when processing transactions and their operations. In accordance with an aspect of the invention, constraints can include freshness constraints associated with individual transactions. Freshness constraints concern relaxed currency requirements for dealing with stale or out-of-date data and ensuring transaction serializability. Such constraints can be verified upon reading data values, during processing, and at commit time.

The use of copies is widespread in e-commerce sites. For example, consider an auction site. When browsing auction postings in a category, it is apparent that data (e.g., items prices, number of binds . . . ) is a little out of date. However, most users understand and accept this, as long as they see completely current data when they click on an individual item. As another example, the following query returns a summary of books that have the specified title:

| | |
|---|---|
| SELECT | I.ID, I.COST, I.SUBJECT, I.ISBN, I.INSTOCK, A.FNAME, A.LNAME |
| FROM | ITEM I, AUTHOR A |
| WHERE | I.AID = A.AID AND I.TITLE = "Database Management Systems" |

Different users might have different freshness requirements for this query. For example, user $U_1$ is about to purchase all of these books and calls transaction $T_1$ to get an up-to-date query result. User $U_2$ is browsing and runs transaction $T_2$, which offers quick response time, even at the cost of allowing the I.INSTOCK column to be out-of-sync. A third user, $U_3$, is studying the relationship between the cost of a book and the number of copies in stock by periodically running the query $T_3$ and recording the results. In this third case, it is acceptable for the result to be stale as long as it reflects a consistent database snapshot (i.e., a database state that is consistent at a certain point of time). In fact, a weaker version of this guarantee might suffice, requiring only that all rows retrieved for a given item reflect the same snapshot with different items possibly coming from different snapshots.

The above example illustrates one scenario tackled by an aspect of the invention. Such a scenario typically arises because of application or middle-tier caching layered on a system such as a database system. However, it is problematic to allow update transactions to read out-of-date values. The conventional correctness criterion for transactions is one-copy serializability, which says that an execution should be equivalent to a serial execution on a one-copy database. The transactions for $U_2$ and $U_3$ in the above example violate this criterion. For example, suppose that a transaction, $T_4$, places an order for an item, thus changing I.INSTOCK for that item, and another transaction, $T_5$, then updates the cost of that item. If transaction $T_2$ issued by user $U_2$ now reads an older cached value of INSTOCK along with the current value of COST, it views a database state that can never arise in a serial execution on a one-copy database.

The subject invention discloses systems and methods of concurrency control for a transaction model that allows an update transaction to read out-of-date copies. In particular, each operation can carry a freshness constraint that specifies how up-to-date a copy must be in order to be read. Furthermore, the subject invention extends conventional understanding of transactions and serializability to account for out-of-date reads that are justified by freshness constraints.

A model of correctness for transactions that may update data yet read from cached copes subject to various freshness constraints is provided herein. Conventional serializability theory cannot be utilized, since all forms of correctness stated in that theory require each transaction to read values as in a serial one-copy execution, which does not hold if slightly stale replicas are used. Thus, a more permissive correctness property is needed that captures an intuitive sense of what a transaction does when it reads stale values.

As in conventional serializability theory, the correctness of an implementation of a physical system can be defined by asserting that the behavior of each transaction in that physical system is indistinguishable from its behavior in a simpler, ideal system where transactions execute serially. Thus, to prove the correctness of a physical system at least two things need to be done. First, an ideal system needs to be defined that reflects a user's model of computation. The serial execution of this ideal system needs to be defined to be correct. Secondly, execution of the implemented system needs to be equivalent to some serial execution of the ideal system.

A database can be modeled as a collection of data items. Since freshness constraints are part of a user's model of computation, the user is aware that transactions read out-of-date values of data items. Such out-of-date items can be called versions of a data item. Thus, in the user's model, a data item is a sequence of versions and a computation is a multiversion execution. That is, the user should understand that each time a transaction updates a data item a new version of that data item is at least conceptually created. Additionally, when a transaction reads a data item, it may read an old version of that item, rather than the most recent one. Each read operation's freshness constraint specifies which versions are satisfactory.

Hence, the ideal system can be a one-copy multiversion database. By one-copy, it is meant that there is a multiversioned master copy of each data item and no cached replicas. The correct execution of the ideal system can be defined to be a serial multiversion execution in which each read operation satisfies its freshness constraint. A physical execution is correct if it is equivalent to a correct execution of the ideal system. Such correct physical executions can be called relaxed-currency (RC) serializable.

Figure 2:
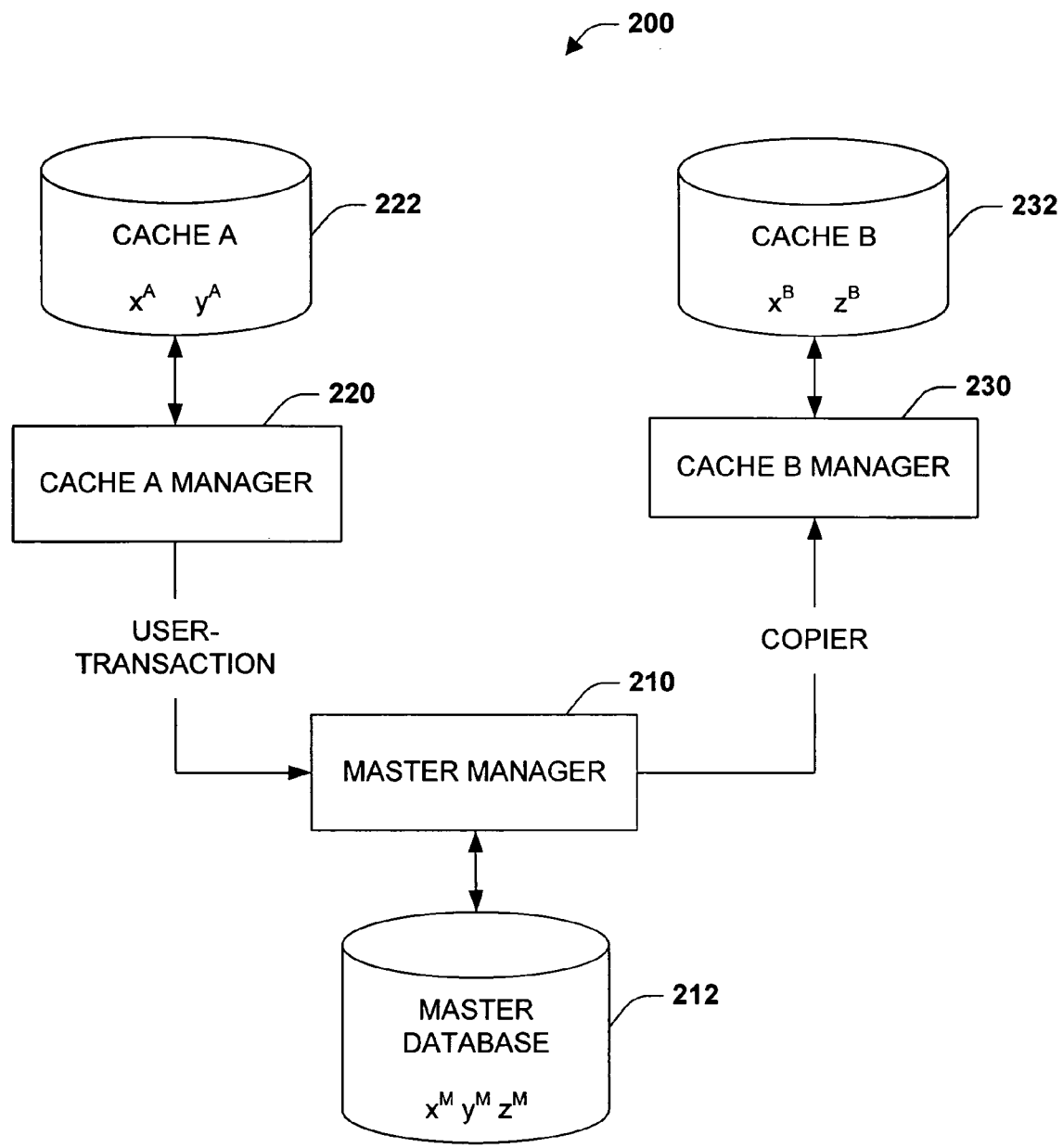
FIG. 2 is a block diagram of a replicated database system in accordance with an aspect of the subject invention.

FIG. 2 depicts an exemplary replicated database system 200 in accordance with an aspect of the subject invention. System 200 includes master manager 210, cache A manager 220 and cache B manager 230 all of which can be components as that term is defined herein. Furthermore, system 200 can include master database 212, cache A 222, and cache B 232. For purposes of clarity, each data item has a unique identity. A transaction can be a set of partially ordered actions, which include reads and writes of data items and a final commit or abort. For simplicity, inserts and deletes of items are not presented in this section, since they would lead to many notational complexities. These operations are described in later sections. The set of items read by a transaction T is denoted readset(T) and the set written by T as writeset(T).

Every data item has a set of copies, namely one master and zero or more replicas. Master database 212 includes the collection of masters of all of the data items. Caches A 222 and B 232 include collections of replicas of one or more data items. There is one version of each physical copy, which contains its latest value. The master database 212 can be associated with and communicatively coupled to master manager 210. Master Manager 210 can control the execution of reads and writes to the master database 212. Similarly, cache A 222 and cache B 232 can be associated with and communicatively coupled to cache A manager 220 and cache B manager 230, respectively. Cache managers A 220 and B 230 can control the execution of reads and writes to their respective caches.

User-transactions (or also referred to herein as simply "transactions") are issued by users. Copy-transactions (or also referred to herein as simply "copiers") can be issued by the master manager 210. Each transaction can issue operations or commands either to the master manager 210 or to a particular cache manager 220 or 230. For example, an update transaction can read from a cache and send write operations to the master database 212 through master manager 210, where the operations are processed and saved. For example, $x^A$ can be updated via transaction T to the master database 212 thereby becoming a new version of $x^M$. After a transaction T commits, the master manager 210 can invoke a copier for each pair [x, B] where x is a data item updated by T and B is a cache that has a replica of x. A copier reads the value of the master $x^M$ and writes that value into the corresponding replica $x^B$ in cache B. Notice that a copier can run outside of the transaction that caused the copier to be invoked. Copiers from the master manager 210 to a given cache can be ordered (e.g., pipelined in commit order) or grouped (e.g., one copier contains reads and corresponding writes for multiple [x, B] pairs).

The techniques provided herein are applicable at least when the master database 212 includes materialized views of base data and when replicas of those materialized views are stored in caches such as 222 and 232. In this case, it is the job of each transaction to maintain the consistency of materialized views with respect to base data. That job can be accomplished by user code or by system code. The master and cache managers can treat updates to materialized views the same as those on base data.

Each read request from a transaction could be required to include a freshness constraint. The cache manager 220 or 230 or the master manager 210 that services such a read should then return the value of the requested item that satisfies the read request's freshness constraint. Freshness constraints can be defined based on time-drift or value-drift of an item from its correct value or on the mutual consistency of multiple item values, among other things. To define constraints precisely timestamps and snapshots can be utilized.

Figure 3:
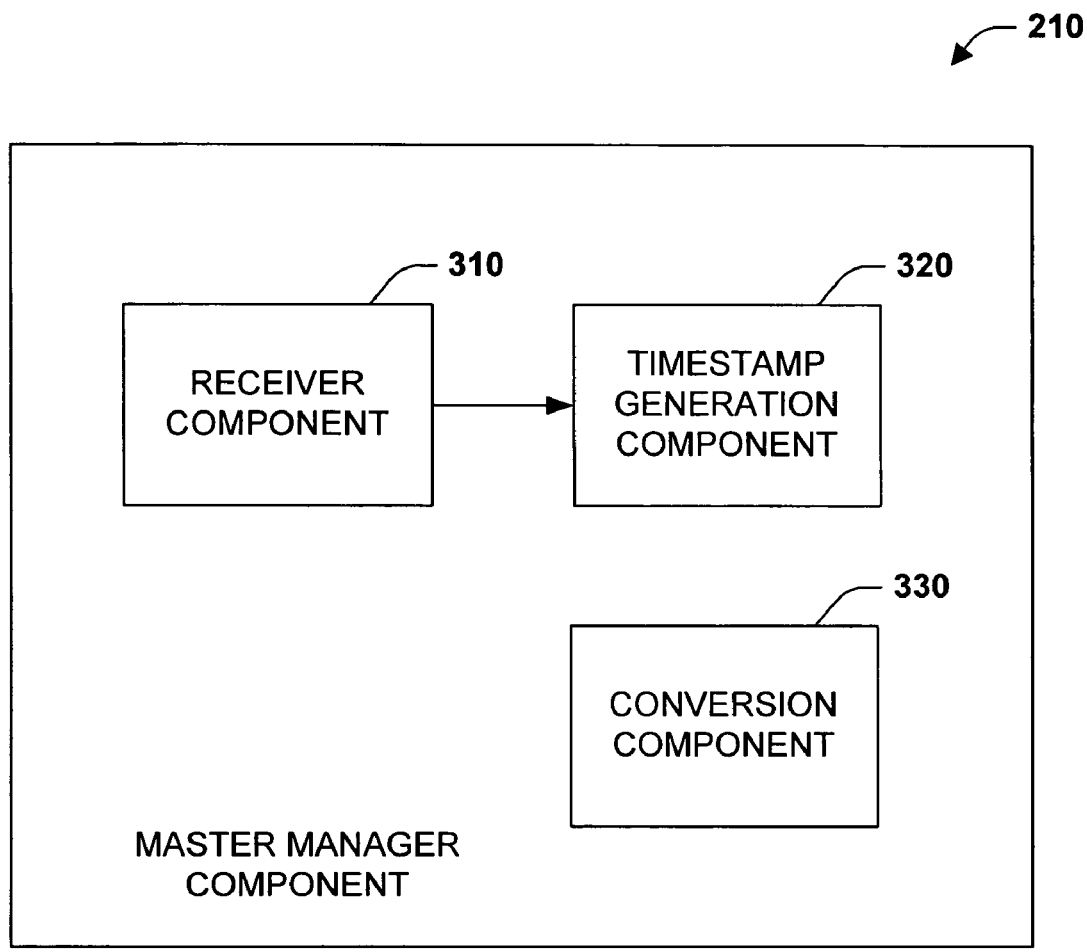
FIG. 3 is a block diagram of a master management component in accordance with an aspect of the subject invention.

Turning to FIG. 3, a portion of master manager component 210 is illustrated in accordance with an aspect of the subject invention. Master manager component 210 can include a receiver component 310, a timestamp generation component 320 and a conversion component 330, among other things. Receiver component 310 can receive one or more transactions that are ready to commit. Based on the received transactions, the master manager component 210 can generate a unique transaction timestamp ts(T) for transaction T that is greater than all timestamps previously assigned utilizing the timestamp generation component 310. A timestamp can be subset of natural numbers representing the current time precisely in fractions of seconds, for example. The master manager 210 and all cache managers can also employ a conversion component 330 to calculate a user-comprehensible wall-clock time from each time stamp and vice versa. Thus, the system can translate a freshness constraint expressed using wall-clock time into one expressed using timestamps. In practice, real-time clocks are fine grained and accurate enough to enable this. Since timestamps can be generated by the master manager 210 alone, clock skew can be ignored.

Every copy including master and replica can have an associated last-modified timestamp. The last-modified timestamp is the timestamp of the last committed transaction that wrote this copy. The value of a copy written by a committed transaction can be called a committed version.

Each committed version $x_i$ of copy $x^A$ of data item x is said to be valid over the half-open interval [t, t') where t=lastmodified ($x_i$) and t' is either the next larger last-modified timestamp of another committed version of $x^A$ or $\infty$ if no version of $x^A$ has a larger last-modified timestamp. The interval [t, t') can be referred to as the valid interval of $x_i$.

A snapshot is a database state produced by a particular set of transactions. Typically, this set will be the committed transactions in the prefix of an execution. A snapshot can be associated with a timestamp t and maps each data item x to the version of x whose valid interval includes t.

The ideal system, which is a user's model, is just like the physical replicated database model or system 200 (FIG. 2) except there is just one copy of each data item (and hence no copiers), and all of its committed versions (from all past writes) are visible to user-transactions. Thus, the semantics of freshness constraints can refer to versions of data items, since there is just one copy of each. Freshness constraints provided herein can be classified into three classes: time bound and value bound constraints, drift constraints and multi-statement constraints.

Time-bound constraints can limit the amount of time between the time a version becomes invalid and the time it is read (e.g., the read time). For example, an entity can specify that it is acceptable to read a version of x that is up to ten seconds out of date: bound(x:10). If bound(x:0), then the read must be given a valid version of x as the version cannot be out of date. For notational simplicity, the time unit is omitted. The time unit can be any unit of time, but herein it will be discussed in terms of seconds.

Value bound constraints can specify that the value read for x, for example, is within a certain percentage of the value of the valid version. A value bound constraint can be specified similar to time bound constraints. For instance, bound(x: 10%) constrains the value of x to within ten percent of a valid version of x.

Drift constraints can provide constraints on multiple data items. When a transaction T reads more than one data item, constraints can be specified over a subset S of the readset(T).

One kind of drift constraint is snapshot consistency. With snapshot consistency, data items in S can be required to read from the same snapshot, denoted snapshot(S), for instance. Another kind of drift constraint is limited time-drift. This constraint can be denoted drift(S, b) and states that for every two items x and y in S, versions of x and y that are read are within b seconds of each other. That is, if the transaction reads version $x_i$ of x and $y_j$ of y, then there are timestamps $t_x$ and $t_y$ such that $x_i$'s valid interval includes $t_x$, $y_j$'s valid interval includes $t_y$, and $|t_x-t_y| \leq b$. It should be noted that snapshot consistency is the special case of b=0. Yet another kind of drift constraint is a limited aggregate value drift. This constraint can require that an aggregate computed over a subset S of the read set of T be within a certain percentage of a recent value. This can be denoted using the notation drift(S, AGG, b %, w) where AGG is an aggregate operation, and w is a time window. It means that AGG(S) must be within b % of AGG(S'), where S' denotes the value(s) of committed versions of items in S at some instant less than w seconds prior to the current time.

It should be noted and appreciated that time-bound, value-bound, and drift constraints can be combined. For instance, a transaction can set bound(x:10) and snapshot({x, y}). That is, x may be up to ten seconds stale and must be read from the same snapshot as y. Furthermore, these constraints can be further classified utilizing two orthogonal criteria: granularity and unit of skew. Granularity refers to constraints over individual data items, sets of items, aggregates over sets of items, subsets of snapshots, and complete snapshots. Unit of skew can be specified utilizing timestamps, number of subsequently committed transactions, or value.

Another kind of freshness constraint is multi-statement constraint. In particular, one can specify session level constraints that refer to points in time external to the execution of the current statement. For example, a transaction's reads must see changes made by preceding statements in this transaction or in this session.

Enforcing relaxed currency serializability requires ensuring that transactions are serializable and that they satisfy their freshness constraints. Enforcing RC-serializability is non-trivial because these requirements are not independent. In fact, freshness constraints are affected by factors related to transaction order such as transaction timestamps. Thus, the different transaction orders in two equivalent serial executions might affect whether certain freshness constraints are satisfied. The goal of RC-serializability is to ensure that each execution has at least one equivalent serial execution in which freshness constraints are satisfied.

Figure 4:
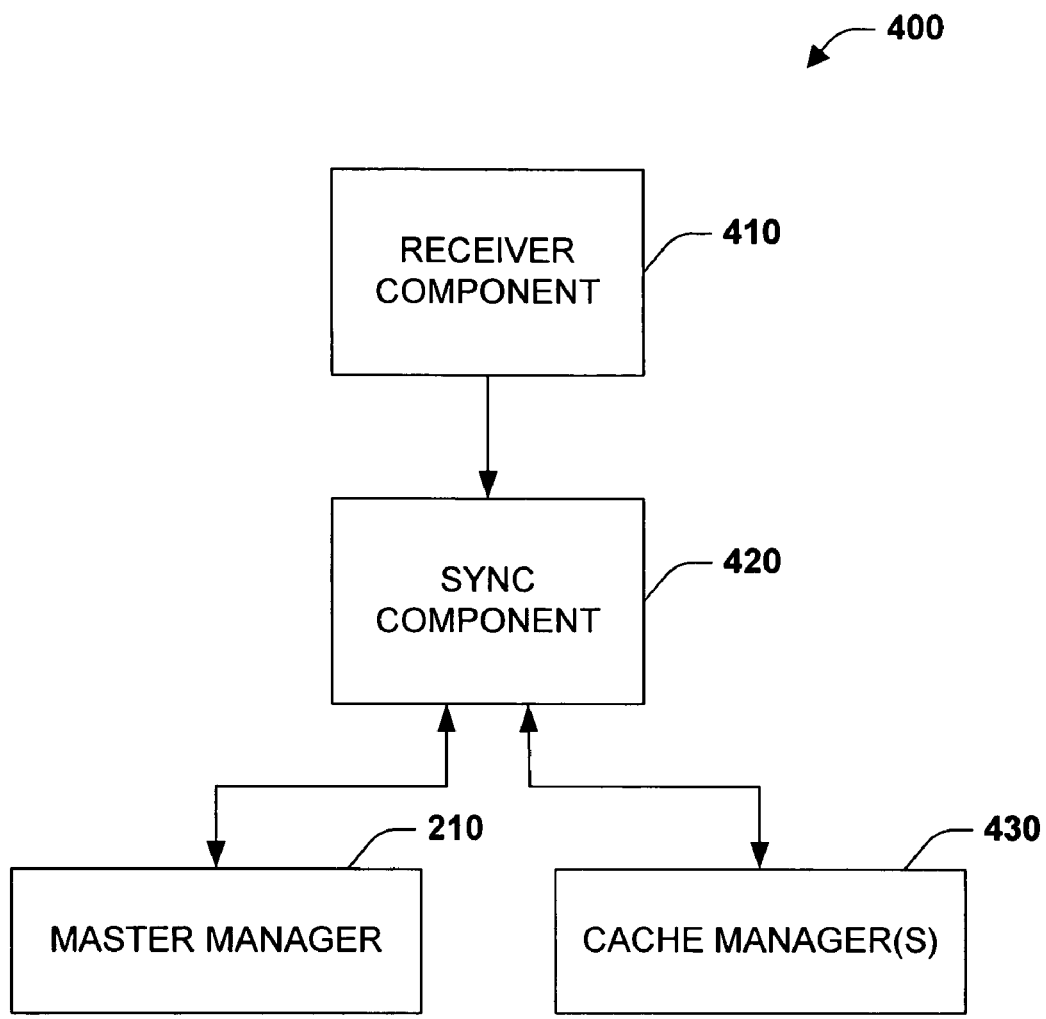
FIG. 4 is a block diagram of a concurrency control system in accordance with an aspect of the subject invention.

Turning to FIG. 4, a concurrency control system 400 is illustrated in accordance with an aspect of the subject invention. System 400 provides a base system for aspects of the invention discussed later. Alone, system 400 does not enforce freshness constraints. It provides a mechanism to support baseline synchronization or general concurrency control. System 400 includes a transaction receiver component 410, a synchronization component 420, a master manager 210, and cache manager(s) 430. Receiver component 410 receives a plurality of transactions (e.g., user and system transactions) and transaction operations. The receiver component 410 can receive/retrieve such transactions and operations and forward them to synchronization component 420. Synchronization component 420 controls the concurrent execution of transactions. In particular, the synchronization component 420 controls and restricts execution order of transactions and transaction operations. Synchronization component can implement a locking scheme where data access is locked and unlocked depending on whether a data item is being accessed.

For example, synchronization component 420 can include a synchronization table to keep track of what data is locked and unlocked. Furthermore, synchronization can facilitate assignment of timestamps to operations. The synchronization component generally can engage in a handshake protocol with the master manager 210 and/or cache manager(s) 430. For example, the synchronization component 420 can pass an operation to the appropriate manager component, wait for acknowledgement, and then pass a subsequent operation. The synchronization component 420 can thereby interact with a master manager 210 and one or more cache managers 440 to read and write data to and from a database and memory, respectively.

Concurrency control system 400 can ensure the synchronization of a few basic transactional operations, among others. In particular, the control system 400 can process reads, writes and commits of transactions and copiers of system transactions. System 400 and specifically synchronization component 420 can execute these operations in a certain manner to ensure concurrency control. For instance, consider the following pseudo code that may be utilized by system 400 to execute particular operations:

```
Write(x) // issued by a user-transaction
    write-lock x^M at the master for x; // lock is held until commit
    write x;
Commit(T) // issued by a user-transaction
    ts(T) ← new transaction timestamp; // ts(T) greater than all prior
        timestamps
    for all items x in writeset(T)
        last-modified(x^M) ← ts(T);
    release all locks;
Read(x) // issued by a user-transaction
    Choose a manager R to read x from; // R can be the master for x or a
        cache
    read-lock x at R;
    read x;
    release read-lock;
Copy(x, P) // a copier transaction
    read-lock x^M at the master for x;
    read x^M and last-modified(x^M);
    release read-lock;
    write-lock x^P at cache manager P;
    x^P ← x^M;
    last-modified(x^P) ← last-modified(x^M);
        // assumes writes are applied in last-modified order
    release write-lock
```

Write operations write lock a data master copy and then write a value. Writes set long duration exclusive locks on master copies that are released only after the transaction commits and its updates are applied at the master. Thus, for each unlocked master item $x^M$, last-modified($x^M$) is the timestamp of the last committed transaction that updated x.

Read operations read lock data to be read, read the data, and then release the lock. Reads set short-duration shared locks. This ensures that each read operation sees a committed value. It also ensures that the data and last-modified value are mutually consistent at the time the read occurs, since there may be a gap between a transaction updating a copy's data value and updating its last-modified timestamp.

A commit operation generates a new transaction timestamp that is greater than all prior timestamps, and applies that timestamp to all items x in writeset(T). Accordingly, for all items x in writeset(T) last-modified($x^M$) is assigned a timestamp. Thereafter, all locks are released.

Copiers are generated by the system. They set short-duration shared locks to read the master copy of an item before propagating that value to a target cache. Updates from copiers are pipelined to each cache in timestamp order, which is the same as commit order. Since updates are propagated in timestamp order to each cache, successive reads of the same data item in a cache sees time moving forward. Of course, if a transaction reads the same item from different caches, this may not hold. This can be avoided by simply defining last-modified(A) for cache A to be the largest value of last-modified($x^A$) of any copy $x^A$ at A. Each transaction $T_i$ remembers the maximum value $m_i$ of last-modified(A) across all caches it read from and attaches it to all reads. Before processing a read of $y^B$, for instance, cache B can check that last-modified (B)$\geq m_i$. If not, it can wait until more updates arrive and the check is satisfied, or it can reject the read.

Figure 5:
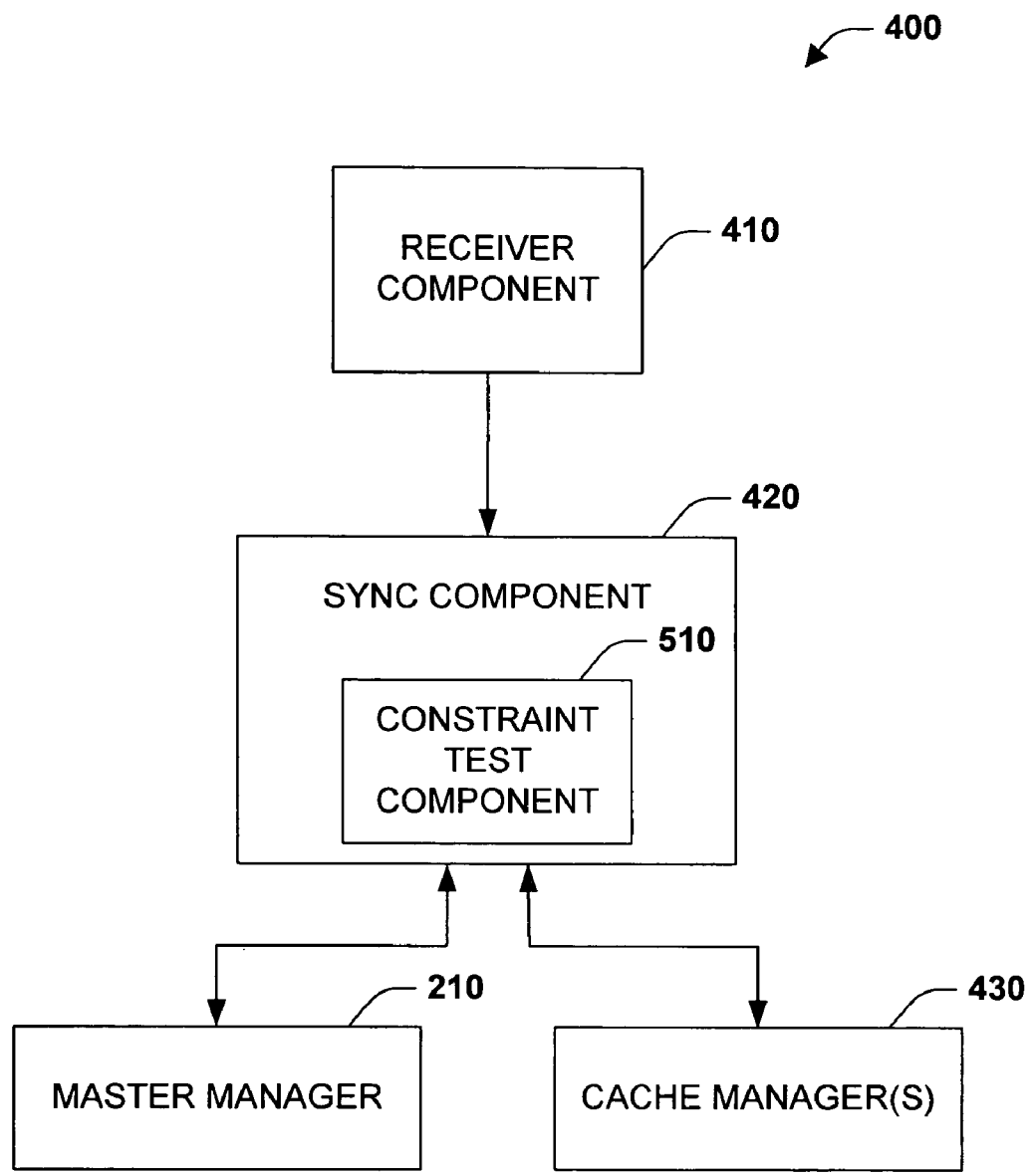
FIG. 5 is a block diagram of a concurrency control system in accordance with an aspect of the subject invention.

Turning to FIG. 5, a concurrency control system 500 is illustrated in accordance with an aspect of the subject invention. Similar to system 400 of FIG. 4, system 500 includes a receiver component 410, a synchronization component 420 as well as a master manager 210 and a cache manager(s) 430. The receiver component 410 can receive and/or retrieve one or more transactions for processing. Upon receipt, the receiver component can forward the transaction to synchronization component 420. Synchronization component 420 can then coordinate processing of transactions and associated operations to ensure serializability. In particular, synchronization component 420 can selectively send transaction operations (e.g., read, write, copy . . . ) to master manager 210, cache manager(s) 430 for processing. In addition to serialization functionality performed by the synchronization component 420, the component can also include or be communicatively coupled to a constraint test component 510. Constraint test component 510 can receive a freshness constraint or test and evaluate such a constraint. Operation execution can be conditioned upon satisfaction of one or more freshness constraints. If a freshness constraint associated with a transaction or operation thereof is not satisfied upon evaluation, then synchronization component 420 can exercise one of at least two options. First, synchronization component 420 could simply delay and attempt to evaluate the constraint later. Additionally or alternatively, the synchronization component could simply cause the transaction to abort. In an update transaction, synchronization component 420 could employ constraint test component 510 to evaluate a freshness constraint on a read. Later, constraint component 510 could be utilized to evaluate a constraint with respect to a write operation. Furthermore, at commit time a constraint could be evaluated again. If at any time the freshness constraint is not satisfied, the update transaction can be aborted.

Conventionally, every copy $x^A$ has an associated timestamp last-modified($x^A$) or something similar. In accordance with an aspect of the subject invention, another timestamp valid-till ($x^A$) can be maintained and associated with every copy of $x^A$, to enable specification and evaluation of freshness constraints. Timestamp valid-till($x^A$) is the smallest timestamp that could be associated with the next version of $x^A$. Regardless of how it is maintained, the value currently held in a copy $x^A$ should have a valid interval that includes the closed interval from last-modified ($x^A$) to valid-till ($x^A$).

Recall that the valid interval of version $x_i$ of x is the half-open interval [t, t') where t=last-modified ($x_i$) and t'is either the next larger last-modified timestamp associated with another committed version of x or ∞ if no other version of x has a larger last-modified timestamp. For the master copy, $x^M$, one can take valid-till($x^M$) to be the largest timestamp issued so far, say t" This works because the next larger timestamp t' of a version of x will surely be larger than t". For a replica $x^A$ one can take valid-till($x^A$) to be last-modified($x^A$). However, if updates are propagated to each cache in timestamp order, then valid-till($x^A$) can be taken as last-modified(A). In this case, valid-till has the same value for all items in a cache and be maintained at cache granularity.

When a read or group of reads is performed, the constraint test component 510 can utilize the read operation's freshness condition, values of last-modified and valid-till, and perhaps other information to deduce a constraint on the timestamp of the reader's transaction. For each transaction T, these timestamp constraints are remembered or stored in memory. When T is ready to commit, its timestamp is assigned and then checked to ensure that it satisfies all of its timestamp constraints. If any timestamp constraint is false, then T aborts. Alternatively, T could be backed out to a save point preceding the read for which the system deduced the failed constraint, or if aborted it could be restarted.

The following provides a manner of specifying particular freshness constraints utilizing transaction timestamps, last-modified timestamps and/or valid-till timestamps, among other things. For purposes of simplicity and clarity and not limitation, each freshness constraint described will pertain to read operations.

A time-bound constraint bound(x:b) can be defined and added to a transaction's constraints as $ts(T_i) \leq vt+b$, where vt is the value of valid-till($x^A$) associated with the value being read, $ts(T_i)$ is the timestamp associate with transaction $T_i$, and b is a unit of time. Recall that bound(x:b) says that the value read by $T_i$ can be at most b seconds out of date. In the simplest implementation, valid-till($x^A$) is the moment that the read is performed. Since, the value of $x^A$ read from data source A is valid until at least vt, then bound(x:b) is satisfied.

Another freshness constraint is a time drift bound constraint, drift(S, b). Recall that S denotes a subset of transaction $T_i$'s read set and for every two x and y in S, the versions of x and y that are read are within b seconds of each other. Let the largest last-modified timestamp associated with any of the copies in S that are read by T be denoted max(last-modified(S)) and let min(valid-till(S)) denote the smallest valid-till timestamp of a copy in S that is read by T. The drift bound constraint can then be specified as max(last-modified (S))<min(valid-till(S))+b. To enforce this drift constraint there must be a timestamp within b seconds of the valid interval of every version read by transaction $T_i$. To understand how the specified constraint accomplished this consider any two data items x∈S and y∈S. Let the valid intervals of the versions read by $T_i$ be $[t_x', t_x'')$ and $[t_y', t_y'')$. Without loss of generality, suppose $t_x' < t_y'$. As shown in FIG. 6, either (i) $t_y' \leq t_x''$ and the intervals overlap or (ii) $t_x'' < t_y'$ and the intervals are disjoint. In case (i) drift({x,y}, b) is satisfied. In case (ii) we need $t_y' - t_x'' \leq b$, or $t_y' \leq t_x'' + b$, to satisfy drift({x,y}, b). Nevertheless, this follows immediately from the check since $t_y' \leq max(last-modified(S)) \leq min(valid-till(S)) + b$, and $min(valid-till(S)) < t_x''$. Since we chose x and y arbitrarily, drift(S, b) holds for all x and y in S.

The tests described above cover freshness constraints for time-bound and limited time-drift. It should be appreciated that snapshot consistency is a special case of limited time-drift where (b=0) and is therefore covered as well.

Value-Bound conditions can be processed if there is a known bound on the rate at which the value of an item can change. For example, the location of a vehicle will not change faster than the vehicle's speed allows. Given such a rate bound, one can deduce a bound on timestamp drift from one on value drift and enforce the deduced time-drift bound. Limited aggregate-drift bounds can be handled similarly, given bounds on the rate of change of values.

Multi-statement constraints were discussed in supra. A session level constraint might say that a transaction sees all updates made by previous transactions within the same session. This can be implemented by having the system remember the maximum timestamp session-max-ts of any committed transaction in the session. When it executes a read of $x^A$, it checks that valid-till($x^A$)≧session-max-ts.

A more challenging multi-statement constraint is that a transaction $T_i$'s reads must see the results of its preceding writes. To enforce this, a list $L_i$ can be maintained including all of the writes executed by $T_i$. Every read from $T_i$ is checked against $L_i$. If $T_i$ previously wrote the item to be read, then the read must be executed at the master so that it sees the prior write.

There can be a number of optimizations or variant implementations of the concurrency control described herein. One optimization is that whenever a constraint is generated, if the system knows that this constraint cannot be satisfied, then the operation can be rejected immediately (i.e., it should return an exception). For example, suppose the check for bound(x:b) takes vt as the value of valid-till($x^A$) at the time the read occurs. The cache manager might know that the timestamp issued to the most recently committed transaction is already greater than vt+b, because it saw an update with timestamp greater than vt+b. In this case, the constraint will not be satisfied when the commit is eventually attempted, so the read should be rejected. However, by using more expensive implementations, one can get larger correct values of vt, which reduce the number of unnecessary aborts in four scenarios where vt may increase over time:

If the master is a multiversion database, then it knows the exact value of valid-till of every version of every data item, which is no smaller than vt. So the constraint vt+b could be replaced by [$x^A$, lm, b] where lm is last-modified($x^A$) of the value read. Using [$x^A$, lm, b], the master can calculate vt+b at commit time, where vt is valid-till of the version of $x^A$ identified by lm.

If the transaction includes last-modified($x^A$) with its update, and if the master finds last-modified($x^M$) to be the same, then it can use its local value of valid-till($x^M$) as vt when checking the constraint.

The cache could be made to participate in two-phase commit (which it may do anyway if the transaction updated the cache). The phase-one processing can re-read last-modified ($x^A$) and valid-till($x^A$). If last-modified($x^A$) is unchanged from the time the transaction read $x^A$, but valid-till($x^A$) has increased (which is likely) then the new value of valid-till($x^A$) can be returned in the phase-one reply and used by the master in the constraint check.

The cache could remember the identity of every replica read by every active transaction. When a replica $x^A$ is updated by a copier, the value of valid-till($x^A$) is recorded and frozen for all active transactions that read it. This is more accurate than the previous method, but adds bookkeeping cost. Again, phase-one processing obtains the latest values of valid-till.

Insofar as last-modified is used for drift constraints, these timestamps can be maintained at a coarse granularity, reducing the space required in the cache for storing these values. The downside is that in place of the accurate last-modified ($x^A$) the largest last-modified($y^A$) is utilized across all $y^A$ in $x^A$'s granule. Thus, max(low, last-modified($x^A$)) may be larger than it needs to be, increasing the chance that max(low, last-modified($x^A$))>min(high, valid-till($x^A$)+b), causing the read of $x^A$ to be rejected. That is, it may increase the number of aborts, but does not lead to erroneous results.

Figure 7:
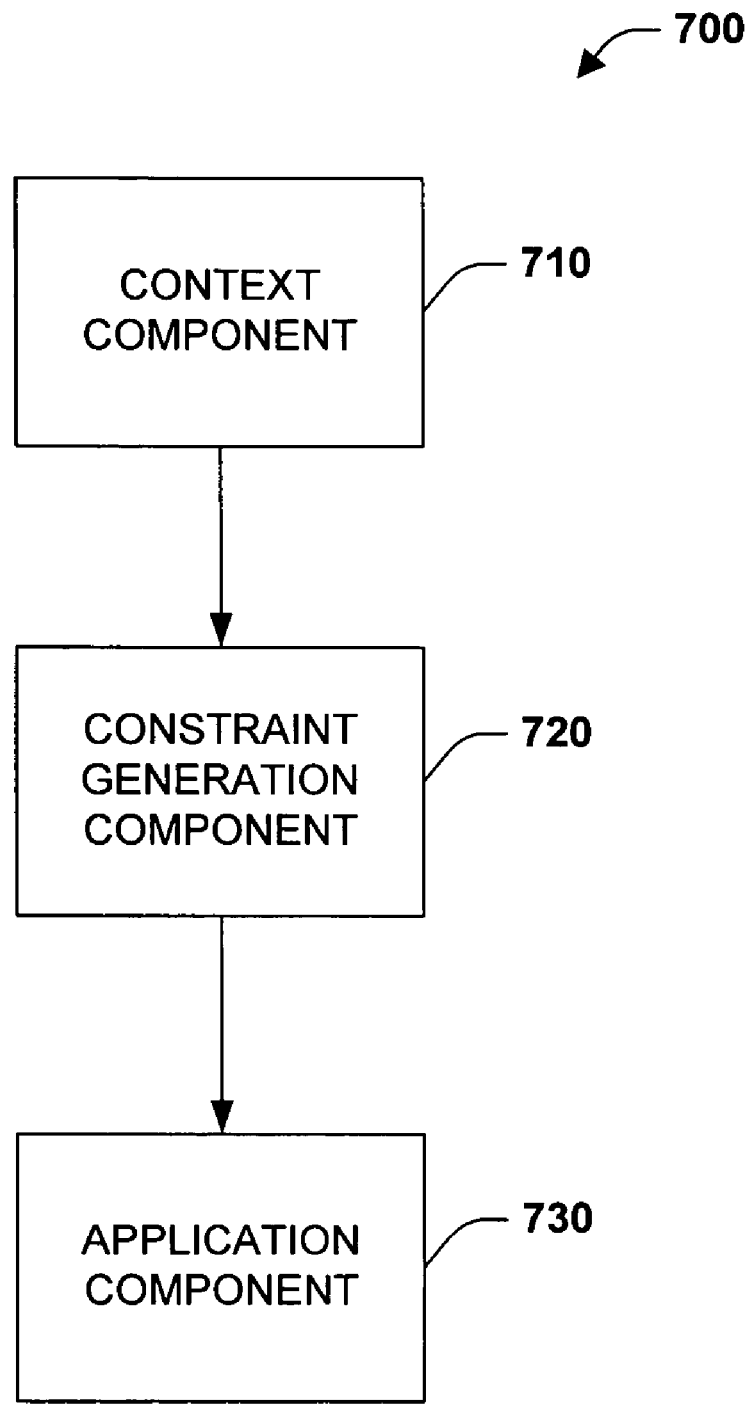
FIG. 7 is a block diagram of a freshness constraint generation system in accordance with an aspect of the subject invention.

Turning to FIG. 7, a freshness constraint generation system 700 is depicted in accordance with an aspect of the subject invention. Throughout this specification, various exemplary freshness constraints or tests have been described that restrict the use of out-of-date data in conjunction with transactions such as an update transaction. Of course, the subject invention is not limited to those presented herein as others will become apparent to one of skill in the art upon reading this specification. These constraints can be selected and specified manually by users for each transaction. However, this can be overly burdensome to a user, especially a less sophisticated user. Accordingly, system 700 is provided to automatically generate freshness constraints on transactions. In particular, context component 710 can receive and/or retrieve a transaction and data regarding its employment. Based on this data, context component 710 can determine or infer (as that term is defined herein) the context relating to a received transaction. Accordingly, it should be appreciated that context component 710 can employ artificial intelligence based systems and methods including but not limited to neural networks, expert systems, Bayesian belief networks, fuzzy logic to reason about or infer states of the system, environment, and/or user from a set of observations as captured via events and/or data. Additionally or alternatively, context component can receive input from a user regarding the context or specifically providing a context. Constraint generation component 720 can receive a context or value representative thereof from the context component 710. From that context, the constraint generation component can generate and/or select an appropriate constraint for a transaction. In a simple implementation, constraints can be provided in a table that corresponds to particular contexts. The constraint generation component can then select one or more constraints based on the received context. In a more complex implementation, the constraint generation component can not only select one or more freshness constraints for a transaction but also custom tailor the constraints in view of the context. Further yet, artificial intelligence-based systems can be employed to select one or more freshness constraints based on the context. Finally, once one or more freshness constraints are generated or selected by generation component 720, they can be forwarded to application component 730. Application component 730 is a mechanism for implementing or associating particular freshness constraints with a transaction. For example, this can be accomplished by modifying an operation such that its execution is conditioned upon satisfaction of one or more freshness constraints or tests.

Figure 8:
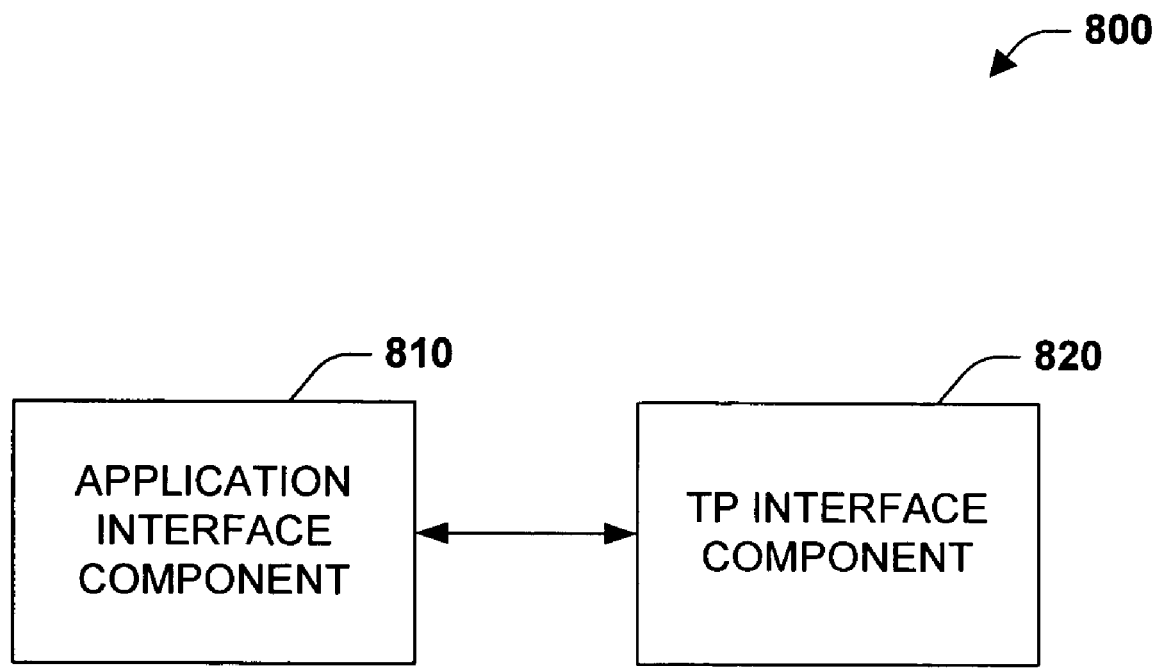
FIG. 8 is a block diagram of an interface system in accordance with an aspect of the subject invention.

Turning briefly to FIG. 8, an interface system 800 is illustrated in accordance with an aspect of the subject invention. Interface system 800 can include two components: an application interface component 810 and a transaction processing interface component 820. Application interface component 810 can receive one or more transactions, such as an update transaction, with one or more freshness or currency constraints associated therewith. Application interface component 810 can receive such data from a user or user application or from another application or entity. A transaction and associated freshness constraints can then be passed, for instance as one or more data packets, to transaction processing (TP) interface component 820. TP interface component 820 can receive the transaction and freshness constraints and process the provided transaction ensuring that the freshness constraint(s) are tested. TP interface component 820 can then provide information regarding the execution transaction (e.g., commit, abort, data . . . ) back to the application component 810. According to an aspect of the invention system 800 can be an application program interface (API) to facilitate interaction with a transaction processing system that supports freshness constraints as disclosed and described herein.

In view of the exemplary systems described supra, methodologies that may be implemented in accordance with the present invention will be better appreciated with reference to the flow charts of FIGS. 9-17. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
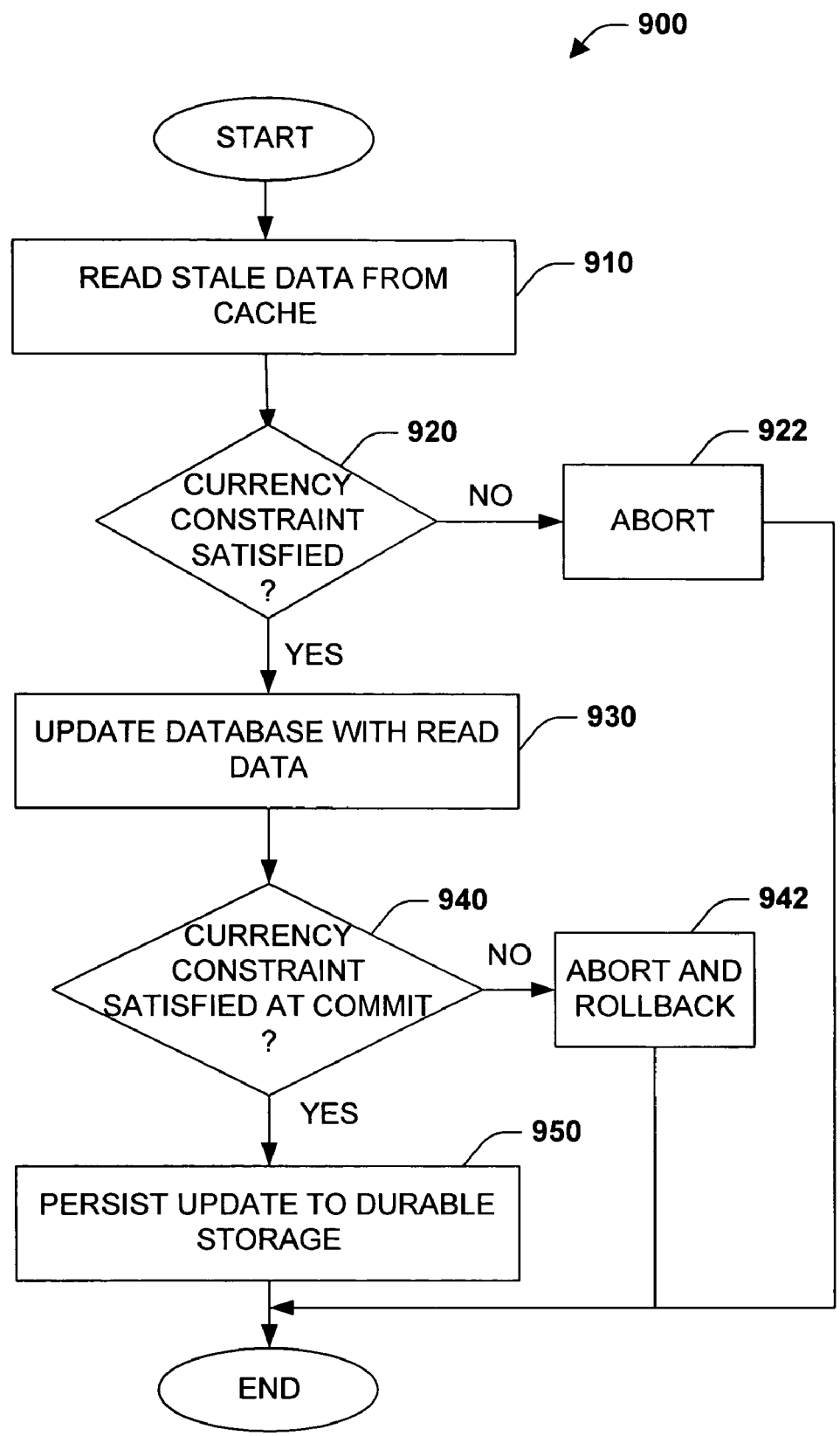
FIG. 9 is a flow chart diagram of an update method in accordance with an aspect of subject invention.

Turning to FIG. 9, a method 900 of updating a database is illustrated in accordance with an aspect of the subject invention. At 910, stale data is read from cache memory. Stale data is data that may not be the most current or up-to-date data. The cache may include any collection of copies that can include all or part of one or more database tables, cubes or materialized views. At 920, the method verifies that the data read satisfies currency or freshness constraints associated with the read operation of the transaction. For example, the data can be scrutinized to determine whether the read occurred within a specified time period after the data became invalid. If the currency constraint is not satisfied, then the transaction can be aborted, at 922, and the method terminated. If however, the constraint is satisfied then the database can be updated or written with the read value, at 930. At transaction commit time, the method again tests and verifies that the currency constraint(s) are satisfied, at 940. If it is not, then the transaction aborts at 942 and any changes made to the database are reversed or rolled back. If the constraints are still satisfied, the method can proceed to 950 where the changes can be persisted to durable storage, for example by writing them to disk.

Figure 10:
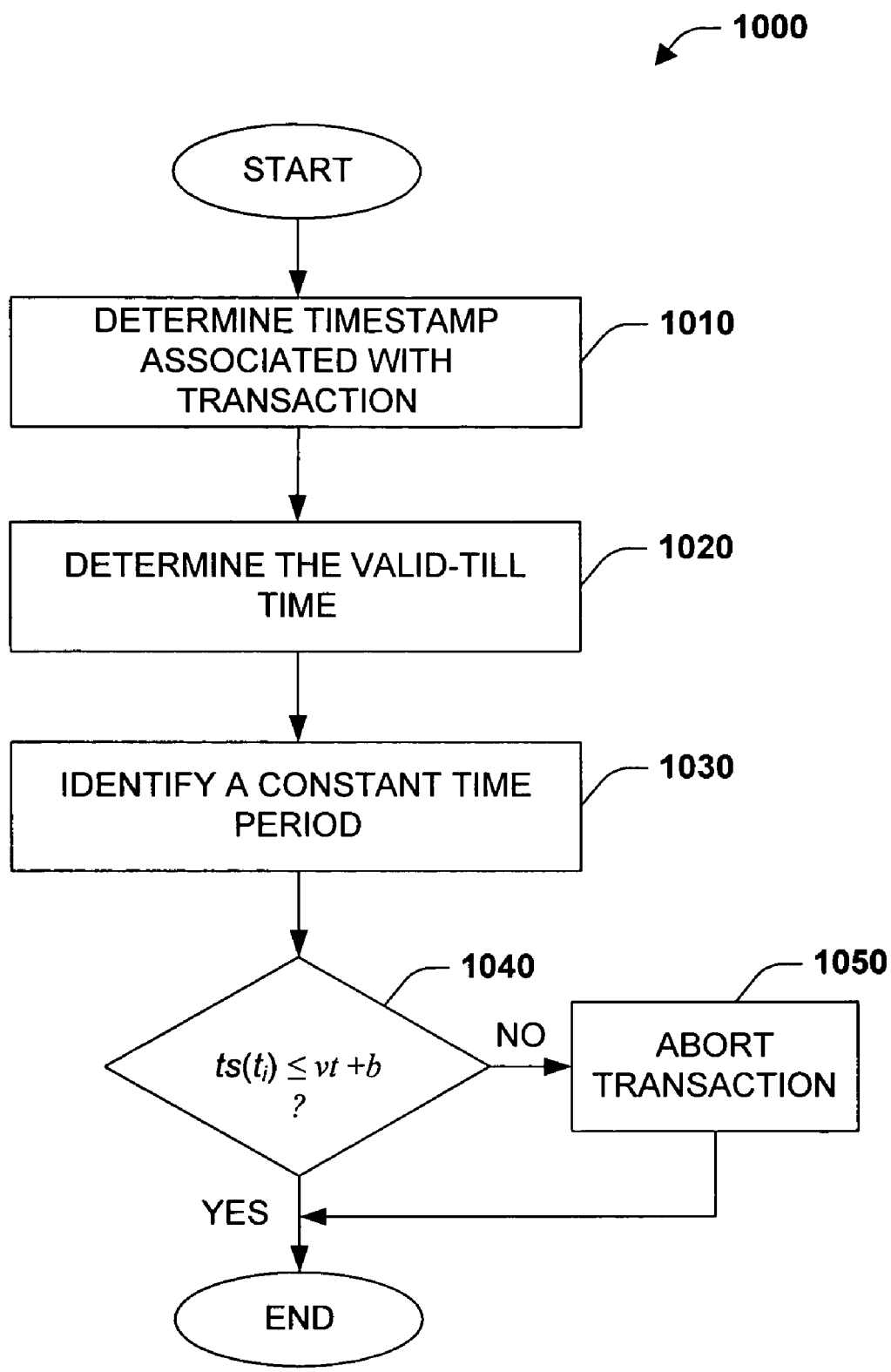
FIG. 10 is a flow chart diagram of a method of testing a time bound currency constraint in accordance with an aspect of the subject invention.

FIG. 10 depicts a method 1000 of testing a time bound currency constraint in accordance with an aspect of the subject invention. At 1010, the time associated with a transaction is determined, for example via a transaction timestamp. At 1020, the valid-till time associated with a data item read or written is determined. At 1030, a constant time period associated with a transaction representing the amount of time between the time a version becomes invalid and the time it is read or written is identified. For example, a person or entity can specify that it is acceptable to read a data version that is up to ten seconds out of date. At 1040, a determination is made as to whether the transaction time ($ts(T_i)$) is less than or equal to the valid-till time (vt) plus the constant time value (b). If the constraint at 1040 is not satisfied then, at 1050, the transaction can be aborted. Otherwise, the constraint is satisfied and the operation associated with the transaction can proceed.

Figure 11:
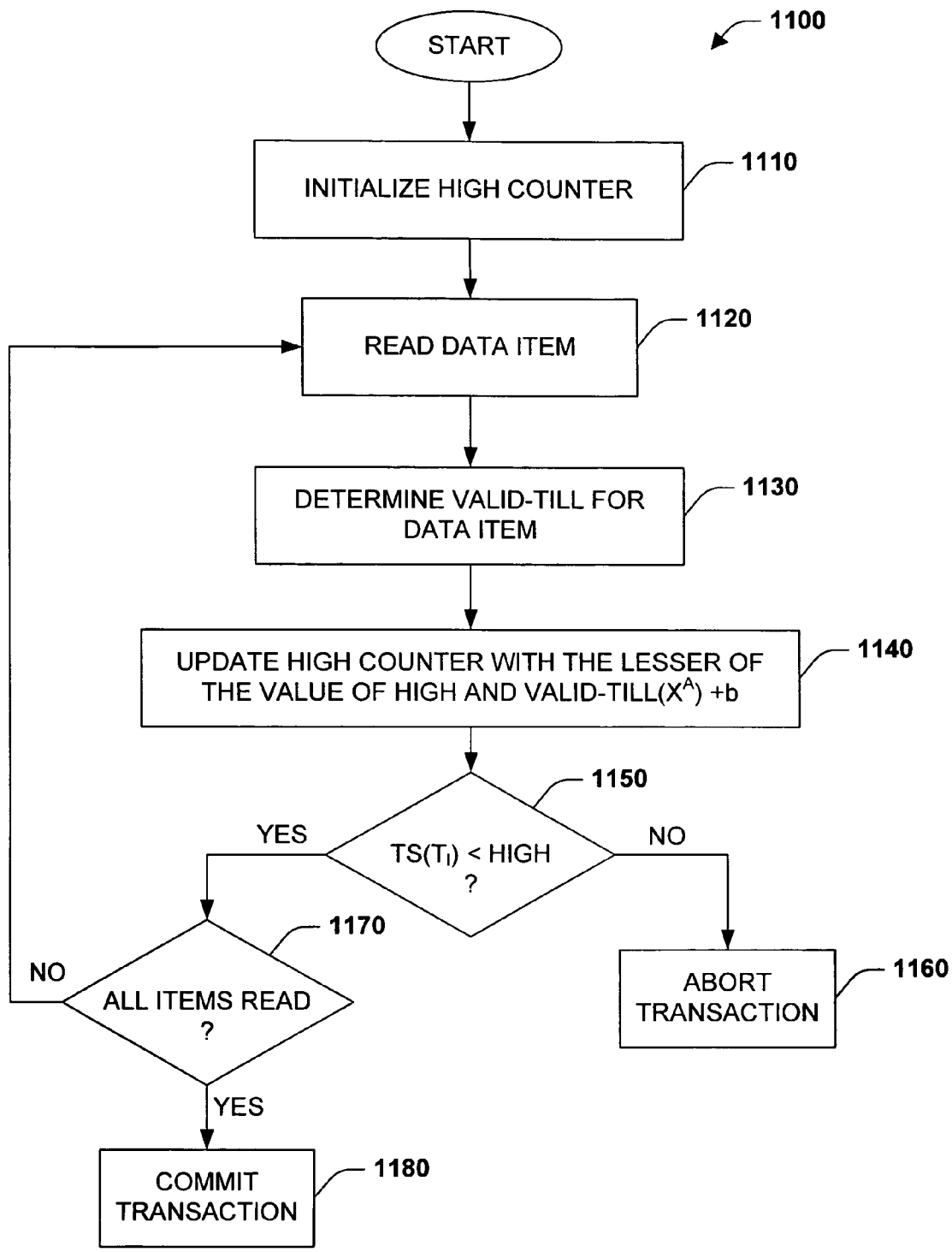
FIG. 11 is a flow chart diagram of an optimized method of testing a time bound currency constraint in accordance with an aspect of the subject invention.

FIG. 11 illustrates an optimized method 1100 of testing a time bound in accordance with an aspect of the subject invention. Method 1100 is an optimization for a time bound currency constraint for the common case when a transaction's read operations are issued in sequence. At 1110, a high counter or variable is initialized to infinity or some very large number. At 1120 a data item is read, for instance from cache. At 1130, a valid-till or expiration time is determined for the data item read. At 1140, the high counter is updated with the lesser of the value of the high counter and the valid-till time for the data item plus a constant time. The constant time can be a programmable value representing the amount of time between the time a version becomes invalid and the time it is read. At 1150, a determination is made as to whether the transaction timestamp is less than the value of the high counter. If no, then at 1160 the transaction is aborted. If yes, then the method proceeds to 1170. At 1170, there is a check as to whether all the transaction read operations have occurred. If they have not, then the method continues at 1120 where another data item is read. If all the reads have occurred then the transaction is committed at 1180.

Figure 12:
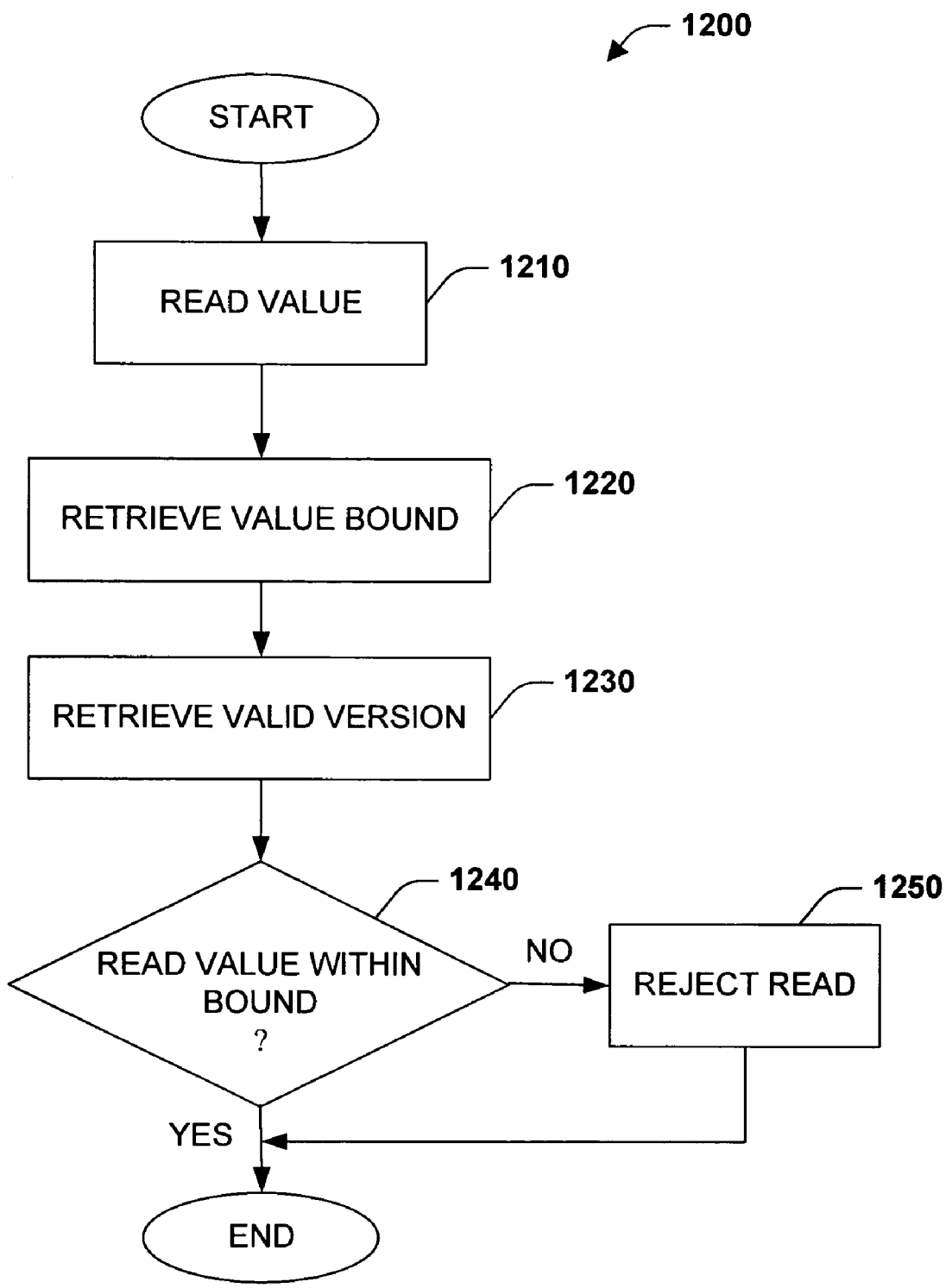
FIG. 12 is a flow chart diagram of a method of testing a value bound freshness constraint in accordance with an aspect of the subject invention.

Turning to FIG. 12, a method of testing a value bound freshness constraint 1200 is depicted in accordance with an aspect of the subject invention. A value bound constraint allows specification that the value of a read operation is within a certain percentage or tolerance of the valid version of a data item. At 1210, a data item value is read, for example from a cache. At 1220, a value bound is retrieved. For example, that bound can correspond to a percentage or other measure of tolerance. At 1230, the value of the last valid version of the data item is retrieved. At 1240, the method tests whether the data item read is within the tolerance specified by the value bound. For example, a determination can be made as to whether the value is within 10% of the last valid version. If it is not, then at 1250 the read can be rejected. If it is within bound, then the constraint is satisfied and the method will terminate successfully.

Figure 13:
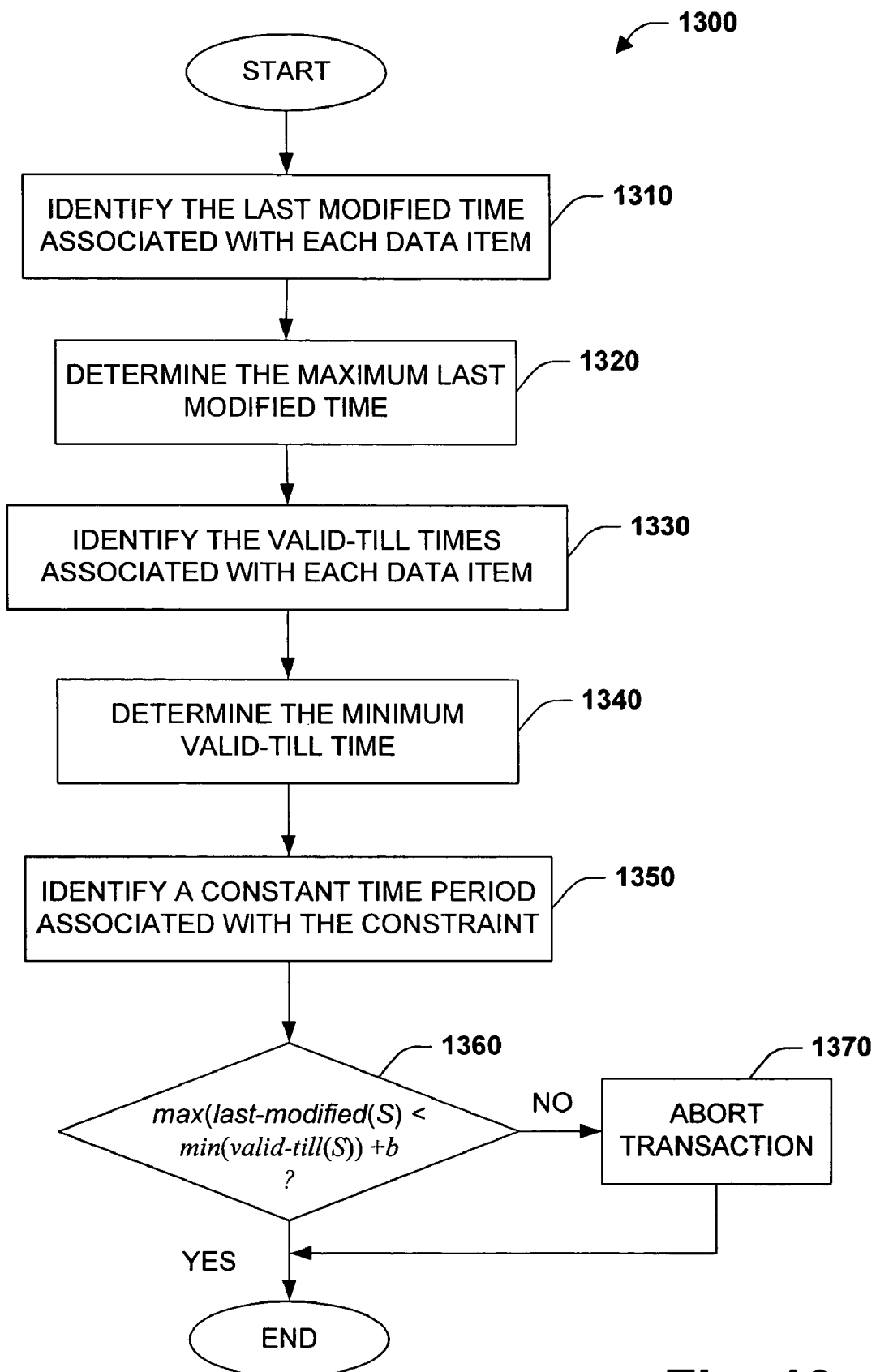
FIG. 13 is a flow chart diagram of a method of testing a limited drift currency constraint in accordance with an aspect of the subject invention.

FIG. 13 is a flow chart of a method 1300 of testing a limited time-drift constraint in accordance with an aspect of the subject invention. Drift constraints relate to multiple data items. When a transaction T interacts with more than one data item then constraints can be specified over those data items. A limited drift constraint states that for every two data items x and y, the versions of x and y that are read, for example, are within a specified time of each other. At 1310, the last modified time associated with each data item is retrieved. This time can take the form of a last-modified timestamp. From those last modified times, at 1320 the largest or maximum last modified time is identified. At 1330, the valid-till times are determined for each data item. The valid-till time denotes the smallest time that could be associated with the next version of a data item. It specifies the upper bound on the valid interval of the value stored for each data item. This time can take the form of a valid-till timestamp. At 1340, the minimum valid-till time is determined amongst the data items. At 1350, a constant period associated with the constraint is identified, for example ten seconds. At 1360, a determination is made as to whether the maximum last modified time is less than the minimum valid-till time plus a constant time. If no, then the transaction is aborted at 1370, as the constraint has not been satisfied. If yes, then the constraint is satisfied and the method terminates successfully.

Figure 14:
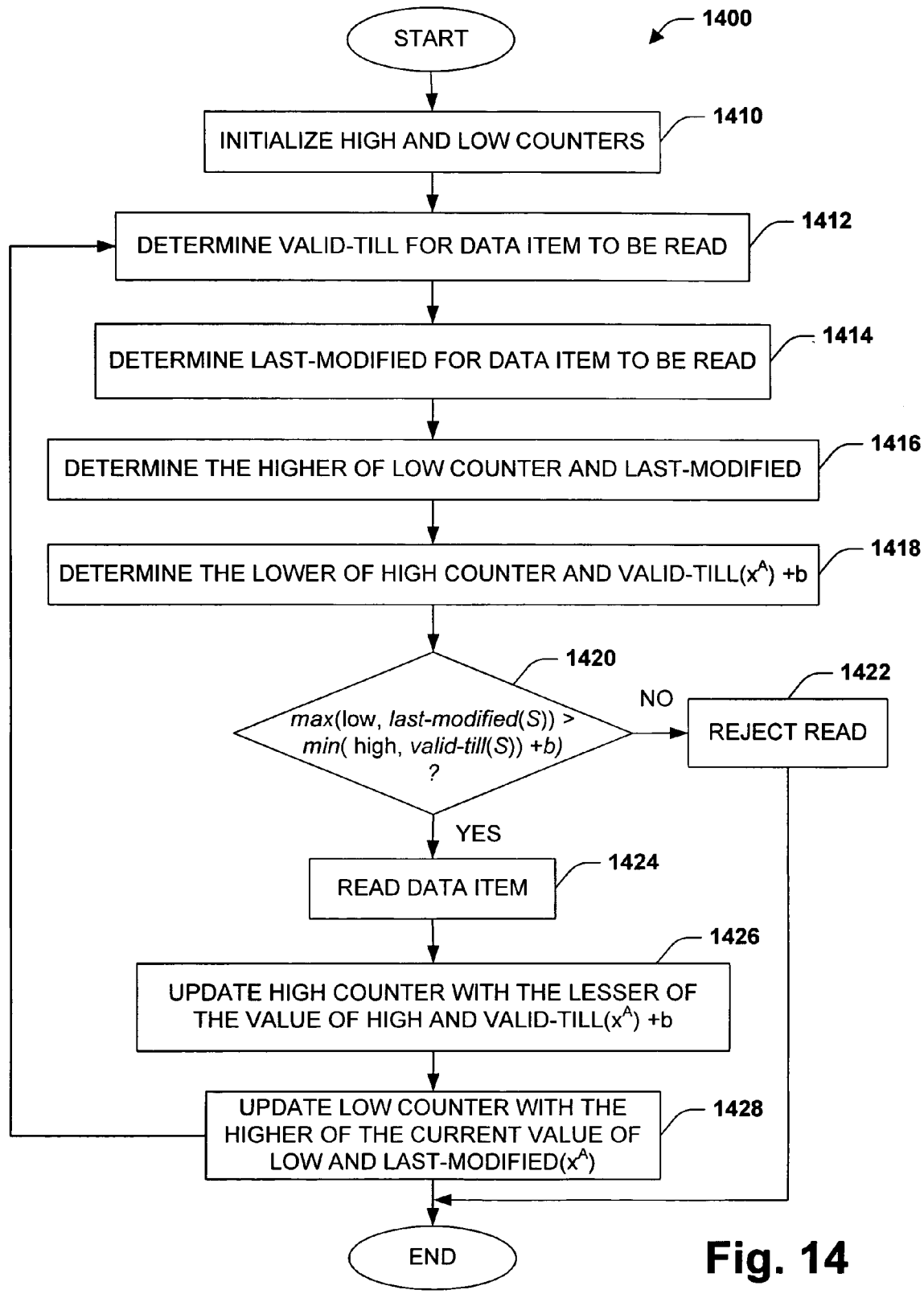
FIG. 14 is a flow chart diagram of an optimized method of testing a limited drift currency constraint in accordance with an aspect of the subject invention.

FIG. 14 depicts an optimized method 1400 of testing a limited drift constraint in accordance with an aspect of the subject invention. Method 1400 is an optimization for a drift constraint for the common case when a transaction's read operations are issued in sequence. At 1410, high and low counters or variables are initialized, for example, to infinity and negative infinity, respectively. In effect, high should have the highest time value possible and low should have the lowest. At 1412, the valid-till time or expiration time for a data item to be read is determined. This can be accomplished by retrieving a valid-till timestamp. At 1414, the time the data item to be read was last modified is determined, for instance by retrieving the last modified timestamp associated with the data item. At 1416, the higher of the low counter or variable and the last modified values is determined. At 1418, the lower of the high counter or variable and the valid-till value plus a specified constant is determined. At 1420, a test is performed to determine if the higher or maximum of the low counter and last modified values is greater than the minimum or lower of the high counter and valid-till values plus a constant. If no, then the read operation is rejected, at 1422. This rejection can then cause the transaction that issued the operation to abort. If yes, then the constraint is satisfied and the value can be read at 1424. At 1426, the value of the high counter can be updated to the lesser of the current value of high and valid-till plus a constant. At 1428, the low counter can be updated to the higher of the current value of low and the last modified time. Although not shown, if all the data items have been read, then the method can simply terminate. If all the values have not been read, then the procedure can proceed to 1412 where the valid-till for the data item to be read is determined. The method can then continue until all the data items are read.

Figure 15:
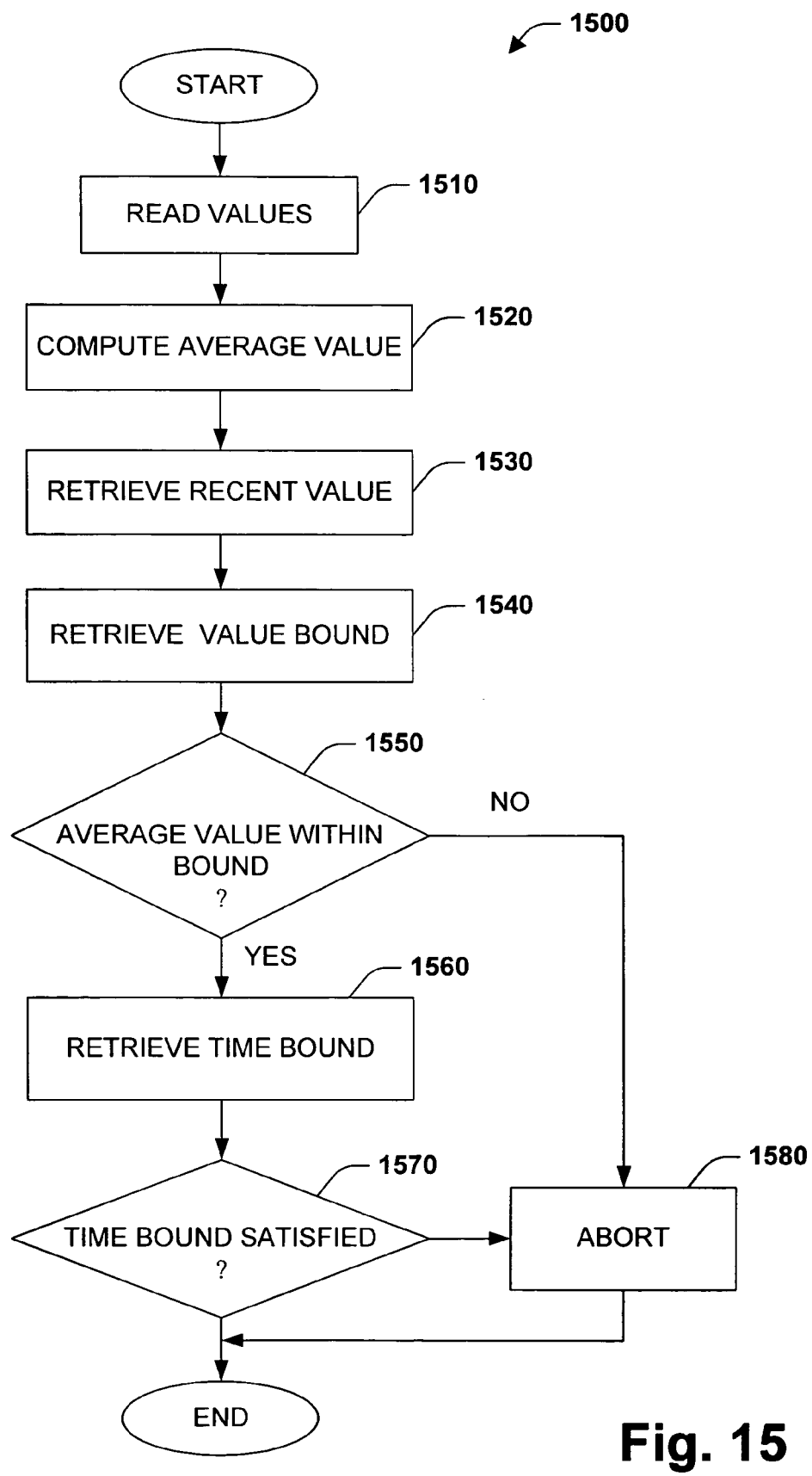
FIG. 15 is a flow chart diagram of a method of testing an aggregate value drift constraint in accordance with an aspect of the subject invention.

FIG. 15 illustrates a method 1500 of testing an aggregate value drift constraint in accordance with an aspect of the subject invention. The aggregate value drift constraint allows one to require an average value of data items to be within a specified tolerance of a valid aggregate value, for example a valid average value. At 1510, a plurality of data item values are read. At 1520, an average value is computed from the read data values. At 1530, a recent or current average value is retrieved, which is a valid aggregate value. At 1540, a value bound is retrieved. For example, the bound can specify a tolerance such as ten percent. At 1550, a determination is made as to whether the average value is within bounds, for instance it is within ten percent of the valid average value. If the value is not within bounds, then the transaction can be aborted at 1580. If the value is within bounds, then a time bound is retrieved, at 1560. Then a check is made at 1570 to ensure that the valid average value satisfies the time bound. This checks to see whether the valid committed versions of data items comprising the valid average value is less than the specified time, for example twelve seconds, prior to the current time. If the time bound is not satisfied, then the transaction can be aborted at 1580, as the aggregate value drift constraint was not satisfied. If the time bound is satisfied, then the constraint is satisfied and the method can terminate successfully.

Figure 16:
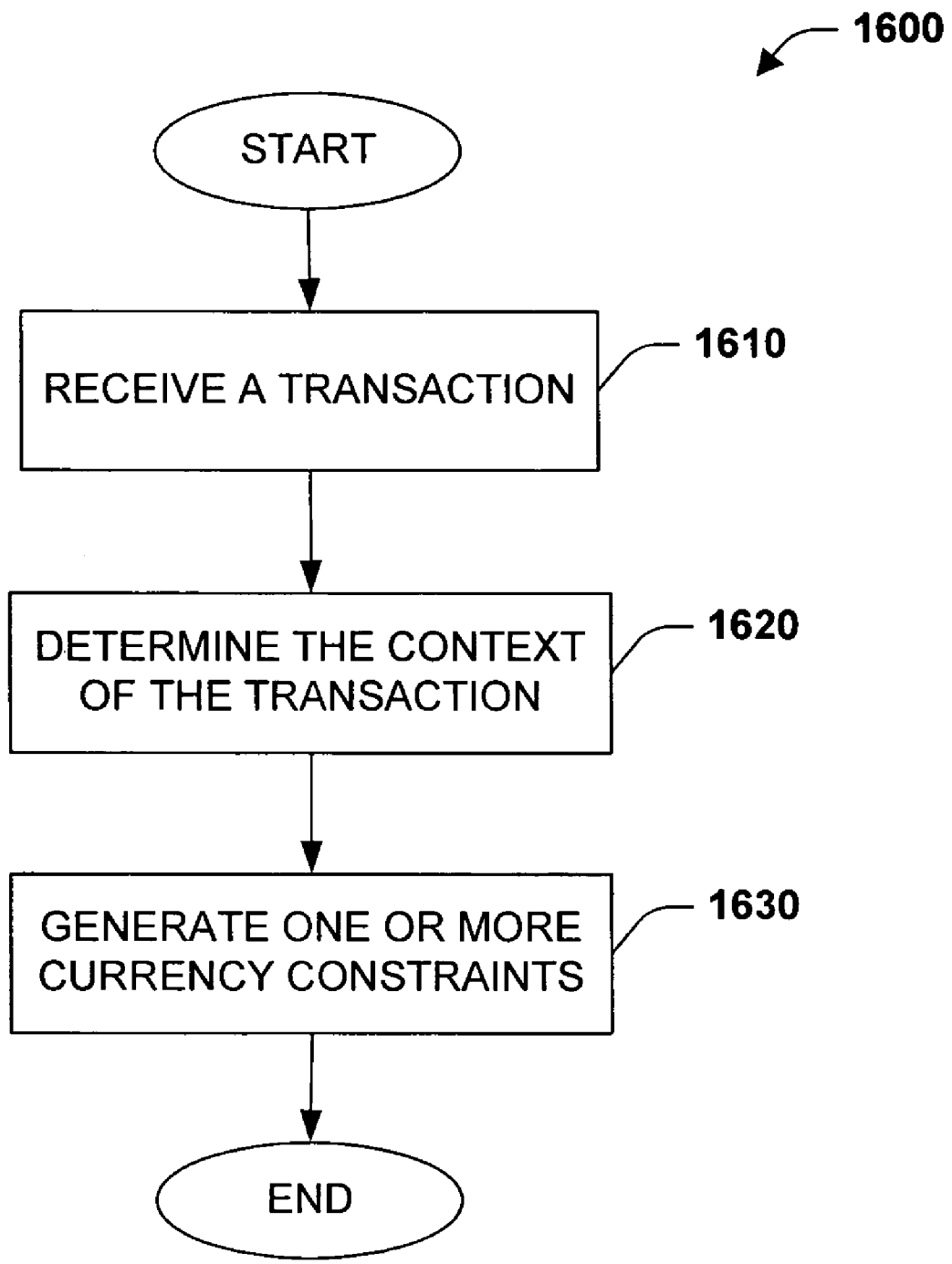
FIG. 16 is a flow chart diagram of a method of currency constraint specification in accordance with an aspect of the subject invention.

FIG. 16 illustrates a method of currency constraint specification 1600 in accordance with an aspect of the subject invention. At 1610, a transaction is received or retrieved. At 1620, the transaction context is determined. The context in which the transaction operates can dictate the number, type and extent of currency constraints. The context can be determined by a user or automatically by inferring the context of the transaction utilizing one or more artificially intelligence systems or methods. At 1530, one or more currency or freshness constraints are generated for a transaction. The constraints can be executed within transaction brackets to ensure the data is as fresh as specified. The constraints can be generated based on the context of the transaction. For example, if the transaction is part of an e-commerce auction website a time-bound constraint may be selected with a ten-second constant such that an acceptable read operation reads a version of data that is up to 10 seconds out of date.

The system can also support insert and delete operations in addition to the described read and write operations. However, since inserts and deletes do not return data to the caller, they need not carry freshness constraints. Thus, they can be run like another update setting locks as appropriate. This can include setting index-range locks or other locks used for avoiding phantoms.

Predicate-based queries, such as SQL Select, use indices and other auxiliary structures for deciding what to access and for avoiding phantoms (e.g., using index-range locking), not just in a master manager but also in a cache. Copies need to include a last-modified timestamp on these structures since these timestamps are used when generating timestamp constraints for time-drift constraints. Additionally, deletes need to preserve certain properties to support currency constraints.

Figure 17:
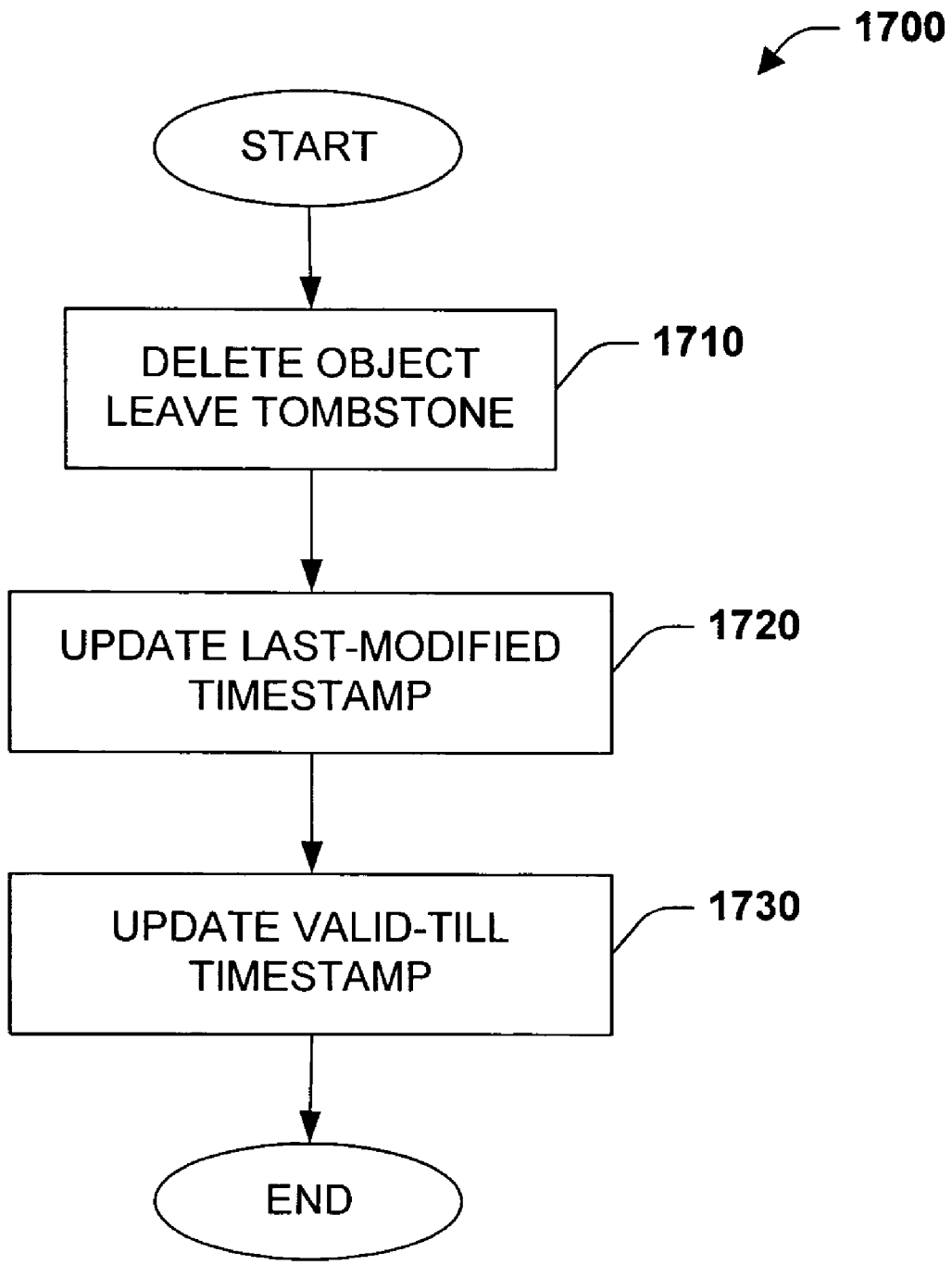
FIG. 17 is a flow chart diagram of a delete operation for supporting currency constraints in accordance with an aspect of the subject invention.

FIG. 17 depicts a delete methodology 1700 for supporting currency constraints in accordance with an aspect of the subject invention. At 1710, a data item or object is deleted and a tombstone (e.g., empty object) is left. At 1720, the last modified timestamp is updated. At 1730, the valid-till timestamp is updated. To understand why this may be required consider the following example. Consider a transaction T that issues a query that reads all objects satisfying a predicate P and suppose a deleted object satisfies P. The deleted object's timestamps should be considered when generating constraints on T's timestamp.

Many variations of the systems and methods disclosed herein are possible and considered within the scope of the subject invention. For example, systems and methods can support reflexive reads, the read time can be varied, and Thomas' Write Rule can be employed.

If a transaction reads an item it previously wrote, one can say the read is reflexive. For simplicity, reflexive reads were excluded from the above discussion. However, reflexive reads can be incorporated herein. One technique is for reflexive reads to occur at the master copy, for instance. This technique requires the system to identify reflexive reads. One way is to tag a transaction that has the potential to perform a reflexive read and run it entirely at the master. Another way is to have the master tell the cache which items the transaction writes. When the cache receives a read, it can check whether the transaction previously wrote it. To limit the overhead, an item could be coarse-grained, such as a table. It could even be an entire database, which means all of a transaction's reads that follow its first write execute at the master. This simplifies the bookkeeping at the expense of forcing some reads to execute at the master unnecessarily.

It should be appreciated that when reading data the time associated with the read can be the time the read operation's transaction commits or prior thereto such as when the read executes. If the read time is when the read executes, then each read can be assigned a timestamp when it starts executing and constraints can be evaluated relevant to that timestamp. Thus, the constraints can be evaluated during execution of the read rather than delayed until commit time. This also implies that cache managers assign timestamps, not just the master. Thus, to avoid timing anomalies, some clock synchronization between them would be needed.

One can use Thomas' Write Rule (TWR) to avoid requiring updates to be pipelined from the master to caches. This can be used in multi-master replication. In TWR a write $w_i[x^A]$ is applied to $x^A$ only if $ts(T_i) \geqq ts(x^A)$. In our case, $w_i[x^A]$ can be issued by a copier so $T_i$ is the timestamp of the user-transaction $T_k$ that induced the copier execution.

An important property of TWR is that given a set of write operations into $x^A$, the final value of $x^A$ is the value written by the copier with largest timestamp, which is independent of the order in which the writes are applied. Thus, TWR can be used to avoid requiring that writes be applied in timestamp order. If copiers no longer apply updates to each cache in timestamp order, then the timestamp of the latest update to the cache cannot be used as the value of valid-till. However, alternative techniques for determining valid-till in the description above can still apply.

If there is a multi-object snapshot constraint, we can place all the objects into a group for which updates are streamed in order from the master to a replica. This ensures that all the replicas will always have the same value of valid-till, ensuring that the snapshot constraint is trivially true as long as all objects are read at a single cache while updates are not occurring to any of the cache's copies of those objects (e.g., by holding read locks at the cache till all the reads in the snapshot have completed).

Figure 18:
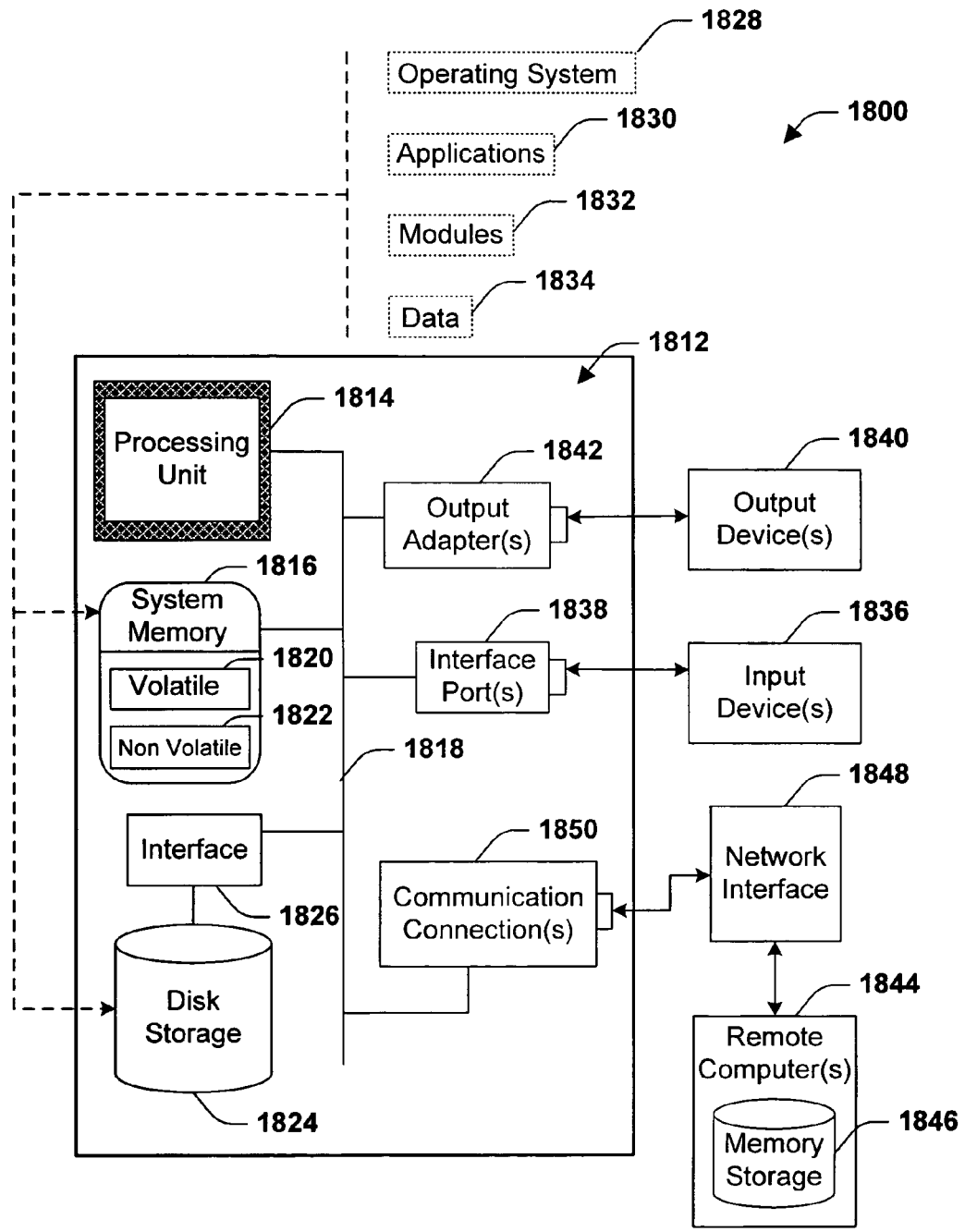
FIG. 18 is a schematic block diagram illustrating a suitable operating environment in accordance with an aspect of the present invention.
Figure 19:
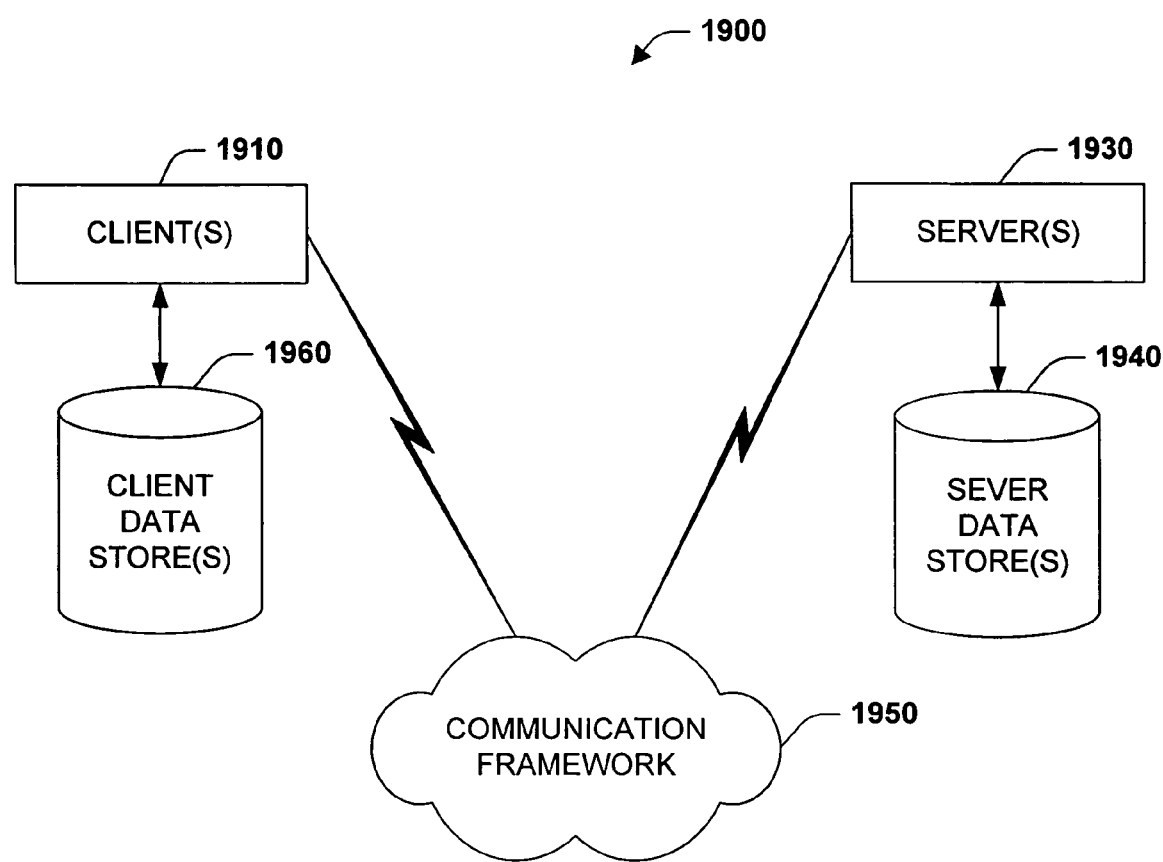
FIG. 19 is a schematic block diagram of a sample-computing environment with which the present invention can interact.

In order to provide a context for the various aspects of the invention, FIGS. 18 and 19 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 18, an exemplary environment 1800 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example disk storage 1824. Disk storage 4124 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the present invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812 and to output information from computer 1812 to an output device 1840. Output adapter 1842 is provided to illustrate that there are some output devices 1840 like displays (e.g., flat panel and CRT), speakers, and printers, among other output devices 1840 that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems, power modems and DSL modems, ISDN adapters, and Ethernet cards.

FIG. 19 is a schematic block diagram of a sample-computing environment 1900 with which the present invention can interact. The system 1900 includes one or more client(s) 1910. The client(s) 1910 can be hardware and/or software (e.g., threads, processes, computing devices). The system 1900 also includes one or more server(s) 1930. The server(s) 1930 can also be hardware and/or software (e.g., threads, processes, computing devices). The server(s) 1930 can house threads to perform transformations by employing the present invention, for example. One possible communication between a client 1910 and a server 1930 may be in the form of a data packet transmitted between two or more computer processes. The system 1900 includes a communication framework 1950 that can be employed to facilitate communications between the client(s) 1910 and the server(s) 1930. The client(s) 1910 are operatively connected to one or more client data store(s) 1960 that can be employed to store information local to the client(s) 1910. Similarly, the server(s) 1930 are operatively connected to one or more server data store(s) 1940 that can be employed to store information local to the servers 1930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A database updates system comprising:
   a processor configured via executing computer executable components stored in a computer readable memory, the computer executable components comprising:
   a receiver component that receives a database update transaction;
   a process component that reads stale data from a cache, wherein the stale data satisfies one or more relaxed freshness constraints associated with the transaction at read time, and the process component processes the transaction, the one or more freshness constraints automatically generated for each update transaction, wherein each data item or group of data has metadata associated therewith identifying when the data item or group of data was last modified and until when it is valid to facilitate definition and enforcement of relaxed freshness constraints;

a verification component which verifies that the one or more relaxed freshness constraints associated with the transaction are satisfied during processing and at commit time, wherein at least one of the relaxed freshness constraints requires that an aggregate computed over a read set of the transaction be within a specified percentage of a recent value, wherein the verification component enforces a time-drift bound relaxed freshness constraint via a determination of whether the last modified time of the most recently modified data item read by the transaction is less than the minimum time a data item read by the transaction is valid until plus a specified time period; and an update component for updating the database with data from the cache, wherein the relaxed freshness constraints are defined through snapshot consistency.

2. The system of claim 1, at least one of the relaxed freshness constraints is time bound and limits the amount of time between the time a version becomes invalid and the time it is read.

3. The system of claim 1, at least one of the relaxed freshness constraints is value bound and specifies a percentage a read data value can vary from the value of a valid version.

4. The system of claim 1, at least one of the relaxed freshness constraints requires that when more than one data item is read, the data items be read from the same snapshot and the data items be read within a specified time of each other.

5. The system of claim 1, the verification component enforces a time bound relaxed freshness constraint via a determination of whether a time stamp associated with the execution of the transaction is less than or equal to the valid until time associated with a data item read by the transaction plus some specified period of time.

6. The system of claim 1, the database update transaction comprising one or more partially ordered operations, wherein an operation comprises a relaxed freshness constraint specifying when to read a version of a data item from the cache based at least on how up-to-date the version is.

7. The system of claim 1, the one or more freshness constraints automatically generated for each update transaction based at least on a context of the transaction.

8. A database update system for relaxed currency constraints ensuring the result is relaxed currency serializable comprising:

a processor configured via executing computer executable components stored in a computer readable memory, the computer executable components comprising:

a receiver component that receives a database update transaction comprising relaxed freshness constraints that specify when to read a version of a data item from a cache based at least on how up-to-date the version is;

a process component that reads out-of-date data associated with the database update transaction from the cache, and verifies that the out-of-date data satisfies one or more relaxed freshness constraints associated with the transaction at read time, the one or more freshness constraints automatically generated for each update transaction based at least on a context of the transaction;

a verification component which verifies satisfaction of the one or more freshness constraints at commit time;

an update component that updates the database with the data item from the cache, wherein the relaxed freshness constraints are defined through snapshot consistency;

a first relaxed freshness constraint that is value bound and specifies a percentage a read data value can vary from the value of a valid version;

a second relaxed freshness constraint requiring that when more than one data item is read, the data items be read from the same snapshot and the data items be read within a specified time of each other;

a third relaxed freshness constraint requiring that an aggregate computed over a read set of the transaction be within a specified percentage of a recent value;

wherein each data item or group of data has metadata associated therewith identifying when the data item or group was last modified and when it is valid until to facilitate definition and enforcement of the relaxed freshness constraints; and the verification component enforces a time-drift bound relaxed freshness constraint via a determination of whether a last modified time of a most recently modified data item read by the transaction is less than a minimum time a data item read by the transaction is valid until plus a specified time period.

9. A method of transactional database interaction comprising:

reading stale cached data;

verifying that the read data satisfies one or more relaxed currency constraints associated with a transaction, wherein the one or more relaxed currency constraints specify when to read a version of a data item from a cache based at least on how up-to-date the version is;

updating a database with the data from the cache, wherein the stale cached data is justified by the one or more relaxed currency constraints; and verifying the one or more relaxed currency constraints are satisfied at commit time, wherein the one or more currency constraints are automatically generated for each transaction based at least on a context of the transaction, and a relaxed currency constraint is satisfied when an aggregate computed over a set of data items read is within a specified percentage of a recent value, wherein the relaxed currency constraints are defined through snapshot consistency at a particular point in time; and associating a last modified timestamp and a valid-till timestamp with each copy of data, wherein verifying satisfaction of one or more relaxed constraints comprises determining whether a timestamp associated with the transaction is less than or equal to the valid-till timestamp associated with the data being read plus a specified period of time.

10. The method of claim 9, a relaxed currency constraint is satisfied when data is read within a programmable time.

11. The method of claim 9, a relaxed currency constraint is satisfied when the value of data read is within a percentage of a value of a valid version.

12. The method of claim 9, a relaxed currency constraint is satisfied when more than one data item is read and the data items are read from the same snapshot.

13. The method of claim 9, a relaxed currency constraint is satisfied when the data items read are within a specified time of each other.

14. The method of claim 9, verifying satisfaction of one or more relaxed constraints comprises:

determining whether a set of data items to be read by the transaction is associated with the same snapshot; and identifying the largest last-modified timestamp associated with a data item in the set;

identifying the smallest valid-till timestamp associated with a data item in the set; and determining whether the largest last-modified timestamp is less than the smallest valid-till timestamp plus a specified period of time.

15. The method of claim 9, further comprising assigning the transaction a timestamp that is that is consistent with the relaxed constraints.

16. The method of claim 9, wherein each data item or group of data has metadata associated therewith identifying when a data item or group of data was last modified and until when it is valid to facilitate definition and enforcement of the relaxed currency constraints;

verifying that the read data satisfies one or more relaxed currency constraints associated with a transaction comprises enforcing a time-drift bound relaxed currency constraint via a determination of whether the last modified time of the most recently modified data item read by the transaction is less than the minimum time a data item read by the transaction is valid until plus a specified time period.

17. The method of claim 9, the one or more relaxed currency constraints comprising:

a first relaxed currency constraint that is satisfied when the value of data read is within a percentage of a value of a valid version;

a second relaxed currency constraint that is satisfied when more than one data item is read within a specified time of each other, and the data items are read from the same snapshot; and a third relaxed currency constraint that is satisfied when an aggregate computed over a set of data items read is within a specified percentage of a recent value;

wherein each data item or group of data has metadata associated therewith identifying when a data item or group of data was last modified and until when it is valid to facilitate definition and enforcement of the relaxed currency constraints; and enforcing a time-drift bound relaxed currency constraint by determining whether a last modified time of a most recently modified data item read by the transaction is less than a minimum time a data item read by the transaction is valid until plus a specified time period.

* * * * *